United States Patent

Bireley et al.

[11] Patent Number: 6,115,703
[45] Date of Patent: Sep. 5, 2000

[54] TWO-LEVEL CACHING SYSTEM FOR PREPARED SQL STATEMENTS IN A RELATIONAL DATABASE MANAGEMENT SYSTEM

[75] Inventors: William Robert Bireley, Morgan Hill; Lisa R. Curran; Fen-Ling Lin, both of San Jose; Adrian Brian Lobo, Sunnyvale; Jerome Quan Wong, Mountain View, all of Calif.

[73] Assignee: International Business Machines Corporation, Armonk, N.Y.

[21] Appl. No.: 09/075,651

[22] Filed: May 11, 1998

[51] Int. Cl.[7] ........................................ G06F 17/30
[52] U.S. Cl. ........................................ 707/2; 707/3
[58] Field of Search ................. 707/2, 3, 4, 8, 707/201; 711/119, 122

[56] References Cited

U.S. PATENT DOCUMENTS

| | | | |
|---|---|---|---|
| 5,448,727 | 9/1995 | Annevelink | 707/101 |
| 5,530,832 | 6/1996 | So et al. | 711/122 |
| 5,542,078 | 7/1996 | Martel et al. | 707/101 |
| 5,584,013 | 12/1996 | Cheong et al. | 711/122 |
| 5,600,833 | 2/1997 | Senn et al. | 707/1 |
| 5,608,904 | 3/1997 | Chaudhuri et al. | 707/2 |
| 5,615,362 | 3/1997 | Jensen et al. | 707/103 |
| 5,812,996 | 9/1998 | Rubin et al. | 707/2 |
| 5,822,749 | 10/1998 | Agarwal | 707/2 |
| 5,897,634 | 4/1999 | Attaluri et al. | 707/8 |
| 5,903,887 | 5/1999 | Kleewein et al. | 707/2 |
| 5,940,289 | 8/1999 | Iwata et al. | 707/2 |

*Primary Examiner*—Paul V. Kulik
*Attorney, Agent, or Firm*—Pretty, Schroeder & Poplawski, P.C.

[57] ABSTRACT

A method, apparatus, and article of manufacture for a computer implemented two-level caching system. A statement is executed in a computer. The statement is executed by the computer to manipulate data in a database stored on a data storage device connected to the computer. Initially, a first statement is prepared to create an executable structure for executing the first statement from an application. Then, the executable structure is stored in an application-level cache associated with the application. A second statement is received for execution from the application. It is determined that the second statement can be executed using the stored executable structure for the first statement. Next, the second statement is executed using the stored executable structure.

33 Claims, 15 Drawing Sheets

TWO-LEVEL CACHING SYSTEM FOR PREPARED SQL STATEMENTS IN A RELATIONAL DATABASE MANAGEMENT SYSTEM

BACKGROUND OF THE INVENTION

1. Field of the Invention

This invention relates in general to computer-implemented database systems, and, in particular, to a two-level caching system for prepared Structured Query Language statements in a relational database management system.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on direct access storage devices (DASD) such as magnetic or optical disk drives for semi-permanent storage.

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

The definitions for SQL provide that the RDBMS software should respond to a particular query with a particular set of data given a specified database content, but the method that the RDBMS software uses to actually find the required information in the tables on the disk drives is left up to the RDBMS software. Typically, there will be more than one method that can be used by the RDBMS software to access the required data. The RDBMS software will optimize the method used to find the data requested in a query in order to minimize the computer time used and, therefore, the cost of performing the query.

Relational database management systems that interact with application programs using dynamic SQL have some inherent problems in achieving the highest levels of performance and concurrence. The dynamic SQL model requires that an application program first present an SQL statement to the RDBMS software to be "prepared". The RDBMS software validates the SQL statement, chooses an access plan for execution, and builds an executable form of the SQL statement. When the prepare request is completed, the application program can then execute the SQL statement. The preparation process often requires much more processing than the actual execution. When the application program later performs a commit operation, the prepared SQL statement is normally discarded. If the application program wishes to execute the SQL statement again, the application program must repeat the prepare request before executing the SQL statement.

Some relational database systems have helped to resolve this problem by using a "global" cache area to save the executable structures of the most recently executed SQL statements. If an application program requests a prepare for a SQL statement that has been globally cached, the entire preparation process can be skipped by obtaining a copy of the executable structures from the global cache. The global cache is generally managed with a least-recently used (LRU) technique to keep the structures for SQL statements used most recently while discarding the structures for the oldest SQL statements.

The global cache approach, however, requires substantial processing costs involved in searching the global cache, making a copy of the executable structures, and managing the LRU technique for optimizing the global cache space. Moreover, the global cache approach is inefficient in that an application program that prepares and executes a SQL statement prior to and after a commit point must release all locks needed for execution of the SQL statement at the commit point, and then re-acquire those locks to execute the SQL statement again. There is a need in the art for an improved method of caching SQL statements.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented two-level caching system.

In accordance with the present invention, a statement is executed in a computer. The statement is executed by the computer to manipulate data in a database stored on a data storage device connected to the computer. Initially, a first statement is prepared to create an executable structure for executing the first statement from an application. Then, the executable structure is stored in an application-level cache associated with the application. A second statement is received for execution from the application. It is determined that the second statement can be executed using the stored executable structure for the first statement. Next, the second statement is executed using the stored executable structure.

An object of the invention is to provide improved caching for SQL statements. Another object of the invention is to provide two levels of caching for SQL statements. Yet another object of the invention is to provide dependency management for two levels of caching. A further object of the invention is to provide management of a local cache and of locks for two levels of caching. Yet another object of the invention is to provide recovery from invalidated or discarded prepared statements for two levels of caching.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
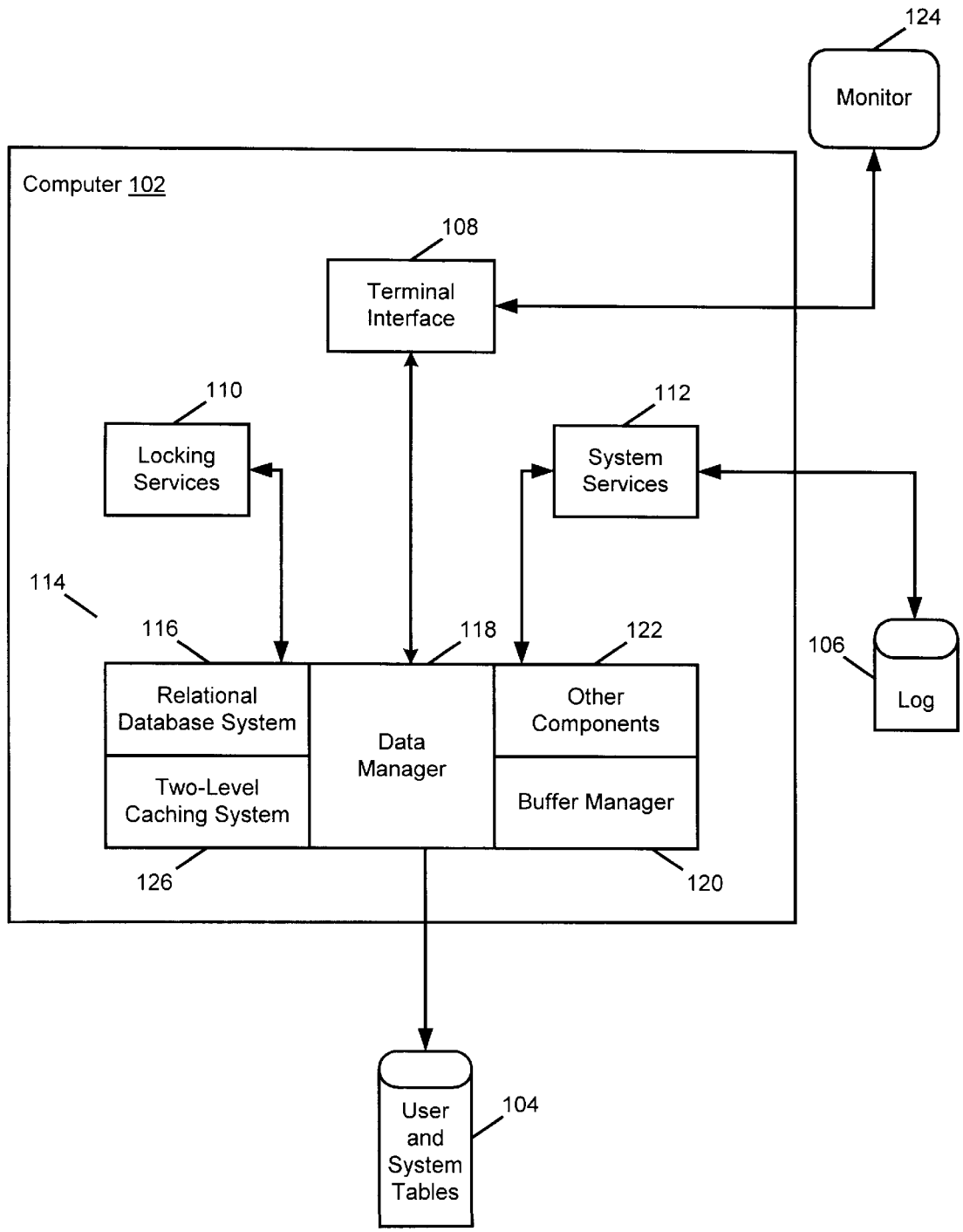
FIG. 1 illustrates an exemplary computer hardware environment that could be used in accordance with the present invention.

FIG. 1 illustrates an exemplary computer hardware environment that could be used in accordance with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108, such as IMS/DB/DC®, CICS®, TSO®, OS/390® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiment of the present invention, the RDBMS software comprises the DB2® product offered by IBM for the MVS® or OS/390® operating systems. Those skilled in the art will recognize, however, that the present invention has application program to any RDBMS software that uses SQL.

As illustrated in FIG. 1, the DB2® architecture for the MVS® operating system includes three major components: the Internal Resource Lock Manager (IRLM) 110, the Systems Services module 112, and the Database Services module 114. The IRLM 110 handles locking services for the DB2® architecture, which treats data as a shared resource, thereby allowing any number of users to access the same data simultaneously. Thus concurrency control is required to isolate users and to maintain data integrity. The Systems Services module 112 controls the overall DB2® execution environment, including managing log data sets 106, gathering statistics, handling startup and shutdown, and providing management support.

At the center of the DB2® architecture is the Database Services module 114. The Database Services module 114 contains several submodules, including the Relational Database System (RDS) 116, the Data Manager 118, the Buffer Manager 120, the Two-Level Caching System 126, and other components 122 such as an SQL compiler/interpreter. These submodules support the functions of the SQL language, i.e. definition, access control, interpretation, compilation, database retrieval, and update of user and system data. The Two-Level Caching System 126 works with the components of the Database Services module 114 to provide two levels of caching.

The present invention is generally implemented using SQL statements executed under the control of the Database Services module 114. The Database Services module 114 retrieves or receives the SQL statements, wherein the SQL statements are generally stored in a text file on the data storage devices 104 and 106 or are interactively entered into the computer system 102 by an operator sitting at a monitor 124 via operator interface 108. The Database Services module 114 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104 and 106. Moreover, the RDBMS software, the SQL statements, and the instructions derived therefrom, are all comprised of instructions which, when read and executed by the computer system 102, cause the computer system 102 to perform the steps necessary to implement and/or use the present invention. Under control of an operating system, the RDBMS software, the SQL statements, and the instructions derived therefrom, may be loaded from the data storage devices 104 and 106 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Figure 2:
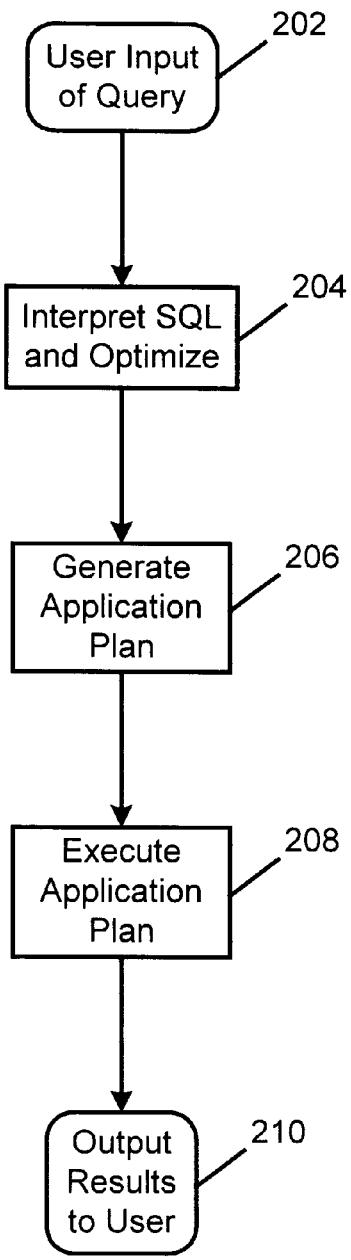
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the present invention. Block 202 represents the input of SQL statements into the computer system 102 from the user. Block 204 represents the step of compiling or interpreting the SQL statements. An optimization function within block 204 may transform the SQL query in a manner described in more detail later in this specification. Block 206 represents the step of generating a compiled set of runtime structures called an application program plan from the compiled SQL statements. Generally, the SQL statements received as input from the user specify only the data that the user wants, but not how to get to it. This step considers both the available access plans (indexes, sequential reads, etc.) and system held statistics on the data to be accessed (the size of the table, the number of distinct values in a particular column, etc.), to choose what it considers to be the most efficient access plan for the query. Block 208 represents the execution of the application program plan, and block 210 represents the output of the results of the application program plan to the user.

Figure 3:
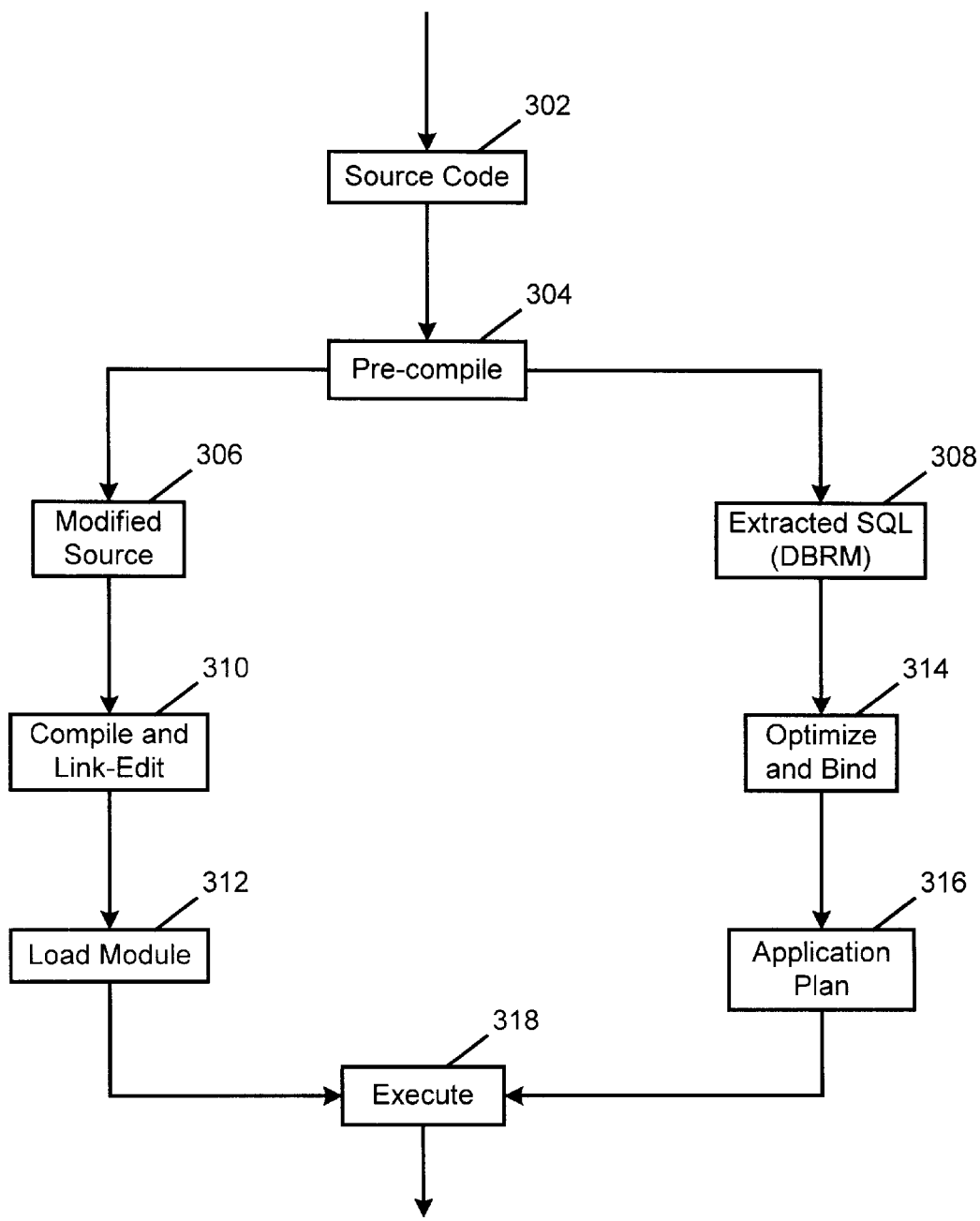
FIG. 3 is a flowchart illustrating the steps necessary for the interpretation and execution of SQL statements embedded in source code according to the present invention.

FIG. 3 is a flowchart illustrating the steps necessary for the interpretation and execution of SQL statements embedded in source code according to the present invention. Block 302 represents program source code containing a host language (such as COBOL or C) and embedded SQL statements. The program source code is then input to a pre-compile step 304. There are two outputs from the pre-compile step 304: a modified source module 306 and a Database Request Module (DBRM) 308. The modified source module 306 contains host language calls to DB2®, which the pre-compile step 304 inserts in place of SQL statements. The DBRM 308 consists of the SQL statements from the program source code 302. A compile and link-edit step 310 uses the modified source module 306 to produce a load module 312, while an optimize and bind step 314 uses the DBRM 308 to produce a compiled set of runtime structures for the application program plan 316. As indicated above in conjunction with FIG. 2, the SQL statements from the program source code 302 specify only the data that the user wants, but not how to get to it. The optimize and bind step 314 may reorder the SQL query in a manner described in more detail later in this specification. Thereafter, the optimize and bind step 314 considers both the available access plans (indexes, sequential reads, etc.) and system held statistics on the data to be accessed (the size of the table, the number of distinct values in a particular column, etc.), to choose what it considers to be the most efficient access plan for the query. The load module 312 and application program plan 316 are then executed together at step 318.

The Two-Level Caching System Overview

The present invention provides a two-level caching system 126 for prepared SQL statements. The two-level caching system 126 maintains a global cache along with a second level of cache at the application level (i.e., "local" cache). The application-level cache allows the application program to maintain a copy of an SQL statement across a commit point. To control this feature, the database system provides an execution option to application programs that allows those application programs to avoid a second prepare request for the same SQL statement following a commit point. When this execution option is requested, the following sequence of SQL statements are valid in an application program:

(1) PREPARE STATEMENT1 FROM
(2) 'UPDATE MY_TABLE SET COLUMN1=999'
(3) EXECUTE STATEMENT1
(4) COMMIT
(5) EXECUTE STATEMENT1

Typically, the prepared SQL statement is discarded after a commit operation. Therefore, without the two-level caching system 126, the above sequence would cause an SQL error at instruction (5) because STATEMENT1 would not have been in a prepared state following the commit operation.

With the two-level caching system 126, when the second execute request (i.e., instruction (5)), occurs in the above example, the two-level caching system 126 does not need to search the global cache. Instead, the two-level caching system 126 obtains the prepared SQL statement to be executed from the application-level cache associated with STATEMENT1. The SQL statement can then be executed immediately, avoiding the costs of searching the global cache or re-preparing the statement.

Because the two-level caching system 126 maintains a local copy of prepared SQL statements for an application program, the application program can retain certain locks across a commit point, avoiding the need to re-acquire those locks on the second execution. This is a technique that has been applied to "static" or "embedded" SQL statements in database systems that need very high transaction throughput rates, but this technique has not been applied to dynamic SQL statements in any conventional systems.

The following technical challenges, which will be discussed in further detail below, are solved to provide an application-level cache that can keep locks across commit points:

Dependency Management and Data Definition Language Concurrency

Managing Application-Level Cache Storage

Recovery from Invalidated or Discarded Prepared SQL Statements

Managing Locks for Optimal Performance

Dependency Management and Data Definition Language Concurrency

When an application program successfully prepares a SQL statement, the two-level caching system 126 ensures that any database objects used by that SQL statement cannot be manipulated by Data Definition Language (DDL) statements, such as DROP or ALTER, until that application program reaches a commit point. For example, assume that an application program requested that the following SQL statement be prepared:

SELECT LASTNAME, FIRSTNAME
FROM EMPLOYEE WHERE EMPNO='123456'

The SQL statement references a table named EMPLOYEE. While the application program is using that SQL statement (from a prepare operation until a commit operation), the two-level caching system 126 will prevent other users from dropping that table or altering the characteristics of that table. Further, when an index is defined on the column EMPNO, and the two-level caching system 126 decides to use that index when executing a SELECT statement, the two-level caching system 126 provides consistency by placing a lock on the object descriptor on which a prepared SQL statement is dependent. The object descriptor is a structure that is saved in the database for each database object. For example, each table or index that has been created in the database will have an object descriptor that defines the characteristics of the object. Holding a lock on the object descriptor for a table is not the same as holding the lock on the table itself. The lock on the object descriptor is primarily used for ensuring that the characteristics of the object do not change while the object is being used. The lock is held until the commit point.

In conventional RDBMS software, prepared SQL statements are discarded at a commit point. By doing so, the RDBMS software gives other users a chance to perform DDL statements. If the application program were allowed to keep the prepared SQL statement past the commit point, the RDBMS software would need to prevent DDL operations on any dependent objects past that commit point as well. This would greatly reduce the ability to use DDL statements for database maintenance while other users are concurrently executing dynamic SQL statements in the system.

The two-level caching system 126 of the present invention describes an alternative dependency management technique that allows prepared SQL statements to be stored past a commit point while allowing DDL concurrence. The two-level caching system 126 ensures the same consistency for dependent objects during the period from a prepare until a commit operation but allows DDL operations to proceed following a commit point. Following a commit point, the application program is not protected from other users dropping objects upon which the application program is dependent. So, if the application program attempts to use the prepared SQL statement following a commit operation, the RDBMS software must verify that all dependent objects are still valid and therefore, the SQL statement is still valid. If it is still valid, the user is again registered as a user of the SQL statement and is protected from that point until the next commit operation.

Managing Application-Level Cache Storage

If the two-level caching system 126 allowed all running application programs to keep copies of prepared SQL statements past commit points, those application programs could potentially use a large amount of the computer's available memory space. The two-level caching system 126 provides a mechanism to govern the amount of space used by the application programs for keeping these "idle" prepared SQL statements. The two-level caching system 126 discards the SQL statements that are least likely to be used again, based on, for example, the "age" of a statement (i.e., a statement that has not been used for a long period of time may be considered the least likely to be used again). The two-level caching system 126 of the present invention describes a design for managing the idle prepared SQL statements kept by all the application programs in the system. The design allows an administrator to set a maximum limit on the total number of idle prepared SQL statements in the system. The two-level caching system 126 monitors this limit, determines when the limit has been exceeded, and discards the oldest SQL statements based on how recently they were prepared.

Recovery from Invalidated or Discarded Prepared SQL Statements

It is possible that an application program has a SQL statement in its application-level cache invalidated or deleted. If this occurs, the two-level caching system 126 provides a means to recover from an application program's attempt to execute the invalidated or deleted SQL statement. That is, when the application program issues an EXECUTE request, the two-level caching system 126 is able to perform the request even though the executable version of the SQL statement is no longer available. The two-level caching system 126 of the present invention achieves this by retaining a copy of the original SQL statement text, even after the executable version is unavailable. Using this SQL statement text, the database can recreate the executable form of the SQL statement by implicitly performing a prepare operation and then performing the EXECUTE. If the implicit prepare is successful, the application program will have no indication that the implicit prepare was required.

Managing Locks for Optimal Performance

One of the advantages of allowing an application program to keep prepared SQL statements past a commit point is that the application program can keep some of the locks needed to execute that SQL statement as well. However, because there are cases where the executable form of the SQL statement might be discarded or invalidated, the two-level caching system 126 is able to release these locks at that time.

SQL Statement Execution

Figure 4:
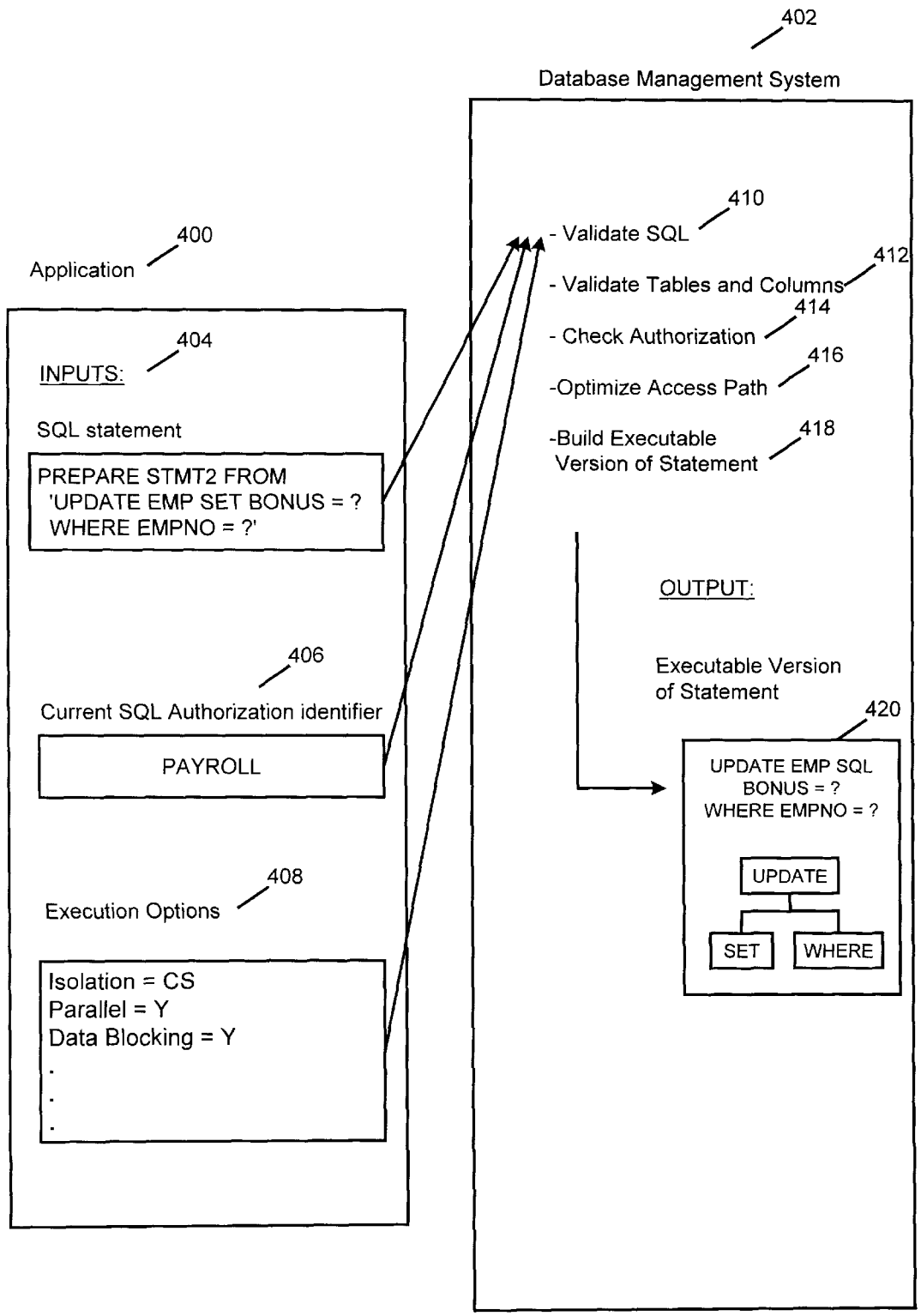
FIG. 4 illustrates the steps performed by the database management system (RDBMS) to pre-process SQL statements in an application program according to the present invention.

The execution of Structured Query Language (SQL) statements is normally a two-step process: pre-processing and execution. The SQL statement is pre-processed prior to execution of the SQL statement. FIG. 4 illustrates the steps performed by the database management system (DBMS) 402 (i.e., which includes the two-level caching system 126) to pre-process SQL statements in an application program 400 according to the present invention. The application program 400 includes SQL statements 404, SQL Authorization identifiers 406, and execution options 408 that are processed by the database management system 402. The work done by the database management system 402 during the pre-processing stage includes parsing the SQL statement text for syntactical correctness 410, verifying the existence of objects referenced in the SQL statement 412, validating the user's authority 414 to execute the requested action, and determining the most optimal method 416 for accessing the data referenced by the SQL statement. After determining the optimal access plan 416, the database manager 400 creates an executable form 418 of the SQL statement. This executable form 418 might consist of machine-readable code, or it might be created as a command sequence or structure. The structure becomes input to an interpreter program during execution which performs the operations defined in the structure. In FIG. 4, the executable form of the SQL statement is represented as a tree structure 420, which is a simplified representation presented for illustrative purposes only. In one embodiment of the present invention, the database management system 402 builds an executable structure that is not reusable by multiple users simultaneously.

Some application programs pre-process and execute SQL statements through the use of "dynamic" SQL statements. By using dynamic SQL statements, an application program can present the text of an SQL statement to the database management system 402 with a PREPARE statement. The application program can then EXECUTE that SQL statement to have the operation within the SQL statement performed. With dynamic SQL, the executable structure created for a SQL statement is typically kept in the computer's memory until it is no longer needed.

Some application programs pre-process and execute SQL statements that are termed "static" or "embedded" SQL statements. The static SQL statements are embedded in an application program. The pre-processing occurs in conjunction with the compilation of the application program. The executable forms of all the SQL statements in the application program are created and stored on disk, just as the executable form of the application program is saved by a language compiler.

Figure 5:
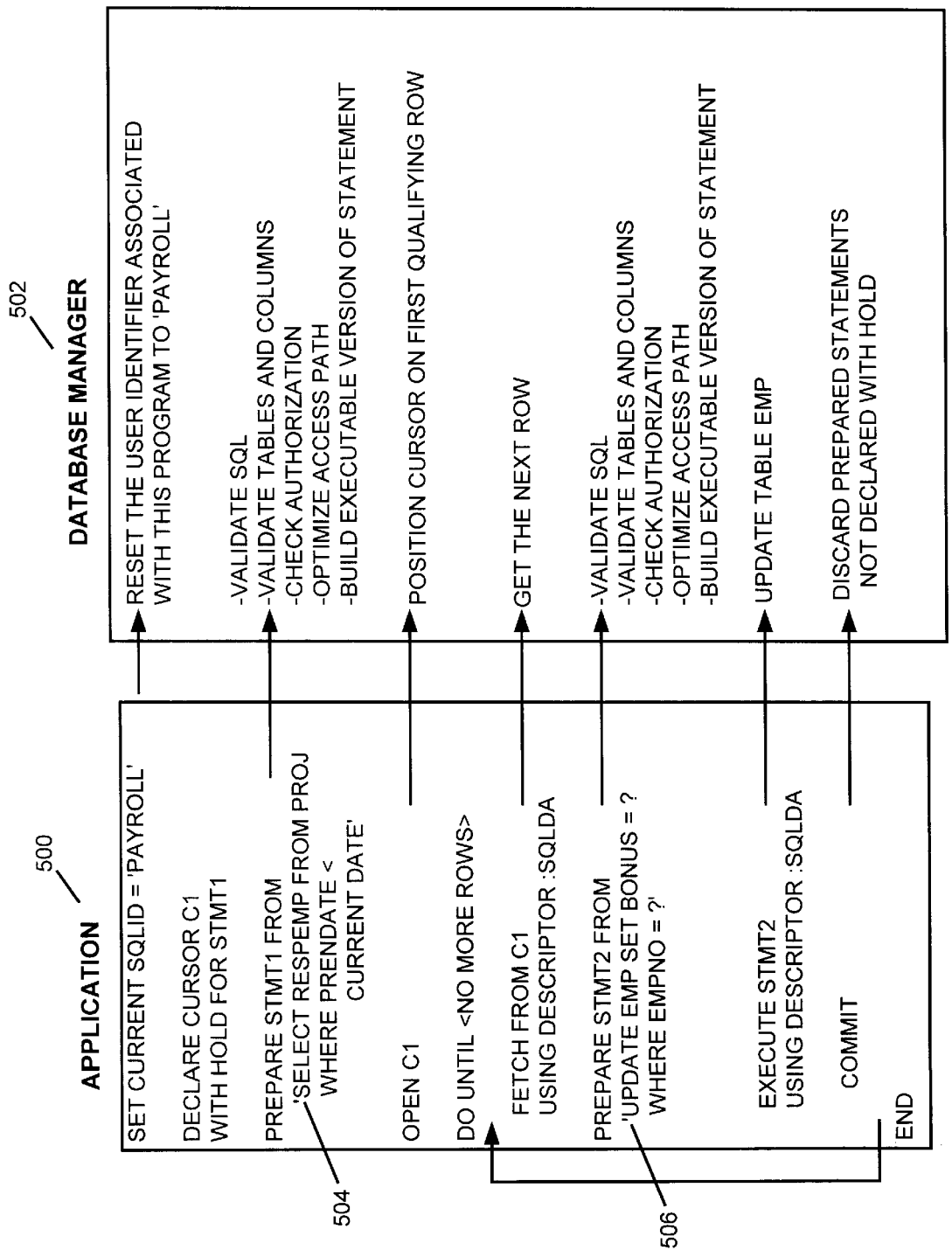
FIG. 5 shows the interaction between an application program that uses dynamic SQL and the Database Manager according to the present invention.

FIG. 5 shows the interaction between an application program 500 that uses dynamic SQL and the Database Manager 502 according to the present invention. The application program 500 uses two SQL statements 504, 506. The first SQL statement 504 is a SELECT statement that will retrieve rows from a table called PROJ. For each project in the table that has been completed as of the current date, the employee number for the project leader is retrieved. This SELECT statement is pre-processed using a PREPARE statement is associated with the identifier "STMT1". STMT1 was associated with a cursor named "C1", and C1 is declared using the syntax "WITH HOLD". This syntax tells the database to retain the cursor's position past a commit point. Without that syntax, the database manager 502 normally closes all open cursors at a commit point.

For each row retrieved, the application program 500 updates an employee's record in the table named EMP to show that the employee should receive a bonus. Assume that the application program 500 needs to perform a commit operation after each change the application program 500 makes to the database. The application program 500 uses a loop to retrieve all the qualifying rows in the table. Within this loop, the application program 500 fetches the next row, then prepares an UPDATE statement 506, associating it with the identifier "STMT2". The application program 500 then executes STMT2, and finally commits the change. The PREPARE for STMT2 is done on each iteration of the loop because the database manager 502 purges prepared SQL statements at commit points. An exception is made for SQL statements that are associated with cursors that were declared WITH HOLD. Those SQL statements are kept in a prepared state because that is necessary to maintain cursor position.

The preparation of dynamic SQL statements for execution in a relational database potentially requires vast amounts of processing, both in terms of CPU usage and I/O activity. Many software application programs that use dynamic SQL are forced to repeatedly perform this process, often for the same SQL statement. This adversely affects both the response time for users of the application program and the number of users that can concurrently run the application program. However, once the prepare process has been completed for a particular SQL statement, considerable processing can be saved by avoiding the expensive preparation process for any subsequent requests to prepare that SQL statement.

There are two cases in which the prepare process must be unnecessarily repeated:

1. A user executes an application program that prepares and executes an SQL statement, then issues a commit operation. During the execution of the commit operation, prepared SQL statements are normally discarded. If the application program needs to execute the same SQL statement again, the application program requests that the SQL statement be prepared again. This is illustrated in the application program shown in FIG. 5. The application program contains a loop that performs both an UPDATE statement and a COMMIT operation. Each time the commit is performed, the prepared SQL statement is discarded. When the application program needs to perform the UPDATE again, the UPDATE statement is prepared again.

2. One user executes an application program that issues a prepare request for an SQL statement. Another user later runs the same, or a different application program that prepares the same SQL statement. Again, consider the application program shown in FIG. 5. Assume that this application program is first run by a certain user named USER1. On this first execution, the RDBMS software performs all the operations required to complete each prepare request. Assume that the application program is later run by another user name USER2. On this second execution of the application program, the RDBMS software again performs all those operations for each prepare request, even though the SQL statement was prepared previously. Many application programs that communicate with relational database systems through SQL are used hundreds, or thousands of times during a day by multiple different users. This results in the RDBMS software repeatedly preparing the same SQL statement.

Some relational database systems have helped resolve this problem by caching the executable structures that are built during the prepare process in a global area. When an application program later requests that the same SQL statement be prepared, the prepare process is avoided by using the structures saved in the cache for that SQL statement. Some implementations solve only the first problem listed above. Others allow sharing of prepared SQL among different users, solving the second problem as well. However, they still have the disadvantage that a global cache search must be performed, possibly in contention with other global cache searches.

The Two-Level Caching System Technical Description

The two-level caching system 126 caches and re-uses prepared SQL statements in a relational database. The two-level caching system 126 provides the following advantages over existing cache designs:

1. Reduction in CPU processing costs used for cache searching and retrieval.

2. Reduction in contention on the cache caused when multiple users access the cache simultaneously.

3. Reduction in the number of requests to the database lock manager for dynamic SQL statements.

These advantages allow the relational database to support more concurrent users and to provide those users with better response time when executing dynamic SQL.

Figure 6A:
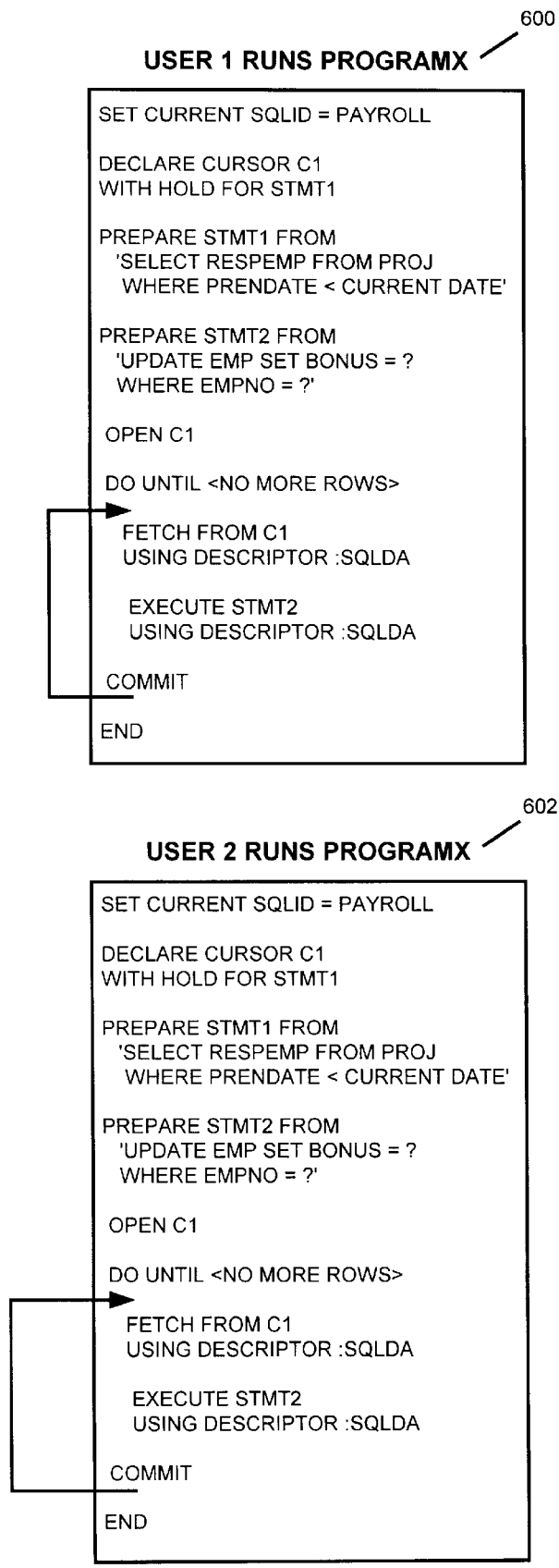
FIGS. 6A and 6B illustrate a high-level diagram of two-level caching according to the present invention.
Figure 6B:
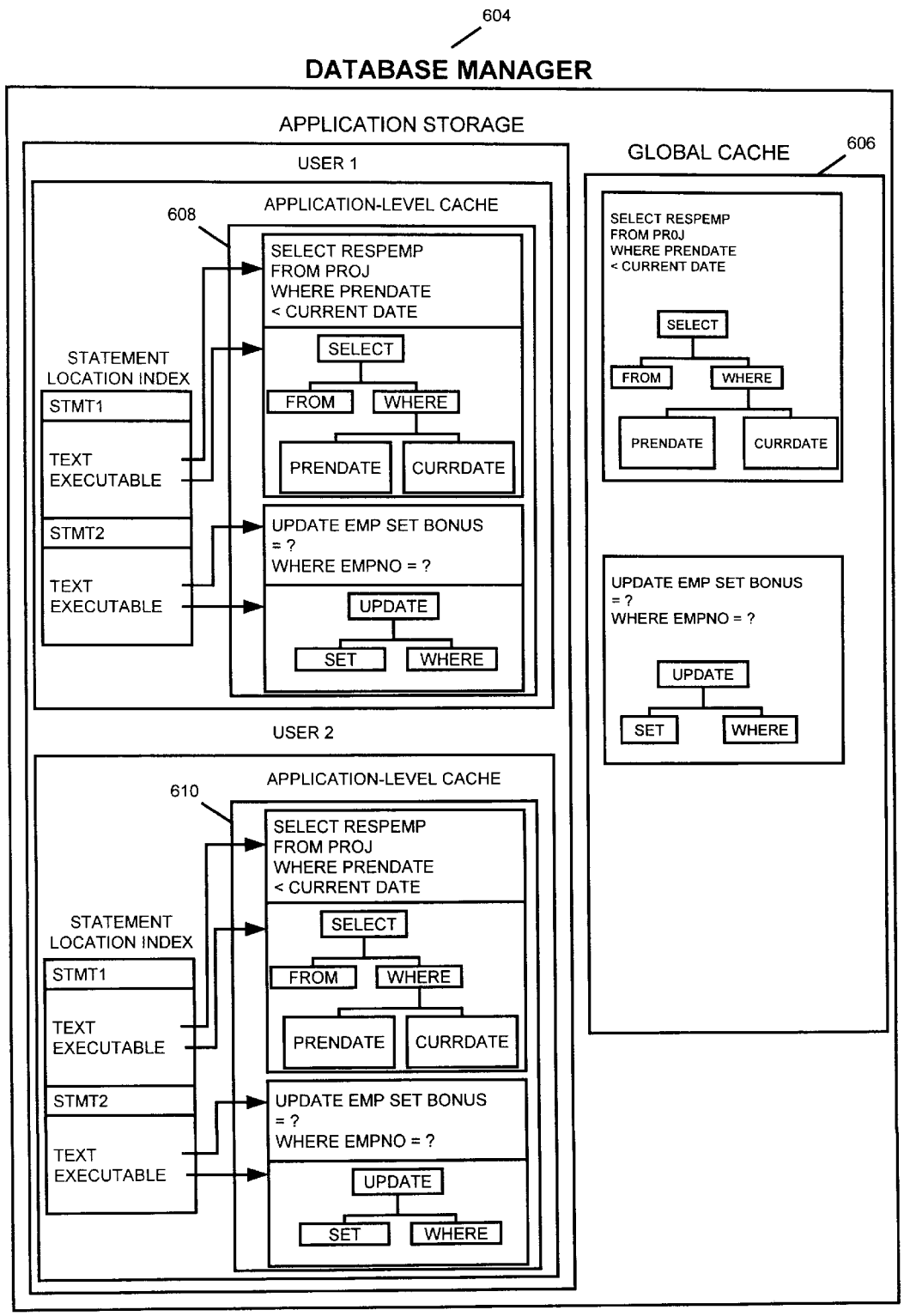

FIGS. 6A and 6B illustrate a high-level diagram of two-level caching according to the present invention. An application program 600, 602 is being executed concurrently by two different users. The database manager 604 provides two levels of caching. The two levels of cache provided are a global cache 606 and an application-level cache 608, 610 for each application program 600, 602.

A global cache 606 provides the ability to store, search, and retrieve prepared SQL statements. This allows an application program 600, 602 to avoid paying the cost of preparing a SQL statement multiple times. The first time the SQL statement is prepared, a copy is inserted into the global cache 606. On subsequent prepare requests for that SQL statement, the database manager 604 can skip the prepare processing and satisfy the request by making a copy from the global cache 606. The global cache 606 is a fixed area of the computer's memory that is used for storing the executable versions of the prepared SQL statements. The database manager 604 provides the logic for managing the global cache 606 by making optimal use of the fixed size. Once the global cache 606 is filled, old SQL statements are discarded as new SQL statements are inserted. The database manager 604 provides a "least-recently-used" (LRU) technique for keeping the most recently used SQL statements.

An application-level cache 608, 610 is a storage area associated with each user, or "application program process" that has connected to the database. When the database manager 606 receives a prepare request from a user, the database manager 606 looks for a prepared statement for the received statement in the global cache 606. If the prepared statement is not found in the global cache 606, the database manager 606 prepares the received statement for the specific user and stores the executable version of the SQL statement in an application-level cache 608, 610 for that user. Following a commit operation, the executable version of the SQL statement remains in the application-level cache 608, 610. If the application program executes the SQL statement again, the copy from the application-level cache 608, 610 is used, avoiding a search of the global cache.

In FIGS. 6A and 6B, an application program 600, 604 is being executed concurrently by two different users, USER1 and USER2. The database manager 604 maintains information about each application program 600, 602 process that is executing in the system. Each of the users in the system constitutes a different application program process, even though the two users are executing the same application program. The database manager 604 is preparing the same SQL statements, each application program process requires its own copy of the executable version of each prepared SQL statement. The database manager 604 uses a SQL statement location table to track the prepared SQL statements that are associated with each of the SQL statement identifiers in the application program 600, 602. In this case, STMT1 and STMT2 are tracked. The statement location table points to locations in memory that are in the application-level cache 608, 610 for that application program process. Two pointers are maintained for each prepared SQL statement: a pointer to the SQL statement text for the prepared SQL statement and a pointer to the executable version of the SQL statement.

The processing of statements in FIG. 5 and in FIGS. 6A and 6B is different, although the SQL statements executed are the same. In FIGS. 6A and 6B, the PREPARE statement for the UPDATE statement has been moved outside of the loop that is used to update each row and commit the change. The use of this alternative SQL semantic is communicated to the database manager 604 through the use of an execution option. For example, in DB2® for OS/390, the application program can be pre-processed with the option KEEPDYNAMIC(YES). That option signals to the database manager 604 that the application program 600, 602 might not issue a PREPARE request before issuing an EXECUTE request, following a commit operation. In this case, the database manager 604 retains the SQL statement text and the statement executable past a commit point. If a subsequent EXECUTE request is received for that SQL statement identifier, the database manager 604 assumes that the SQL statement executed before the commit operation is the one that should be executed. The database manager 604 does not need to perform a prepare. Also, the database manager 604 does not need to search the global cache 606 for the SQL statement. The application-level cache 608, 610 has the copy of the executable version of the SQL statement, so the execution can proceed immediately.

If the application program had instead issued a new PREPARE request following the commit operation, the database manager 604 would discard the previous SQL statement and proceed to prepare the new SQL statement.

Flow Diagrams

The following sections detail the logic that occurs during PREPARE, EXECUTE and COMMIT operations in the two-level caching system 126. Later sections discuss how this logic solves the challenges of a two-level caching system 126.

Figure 7A:
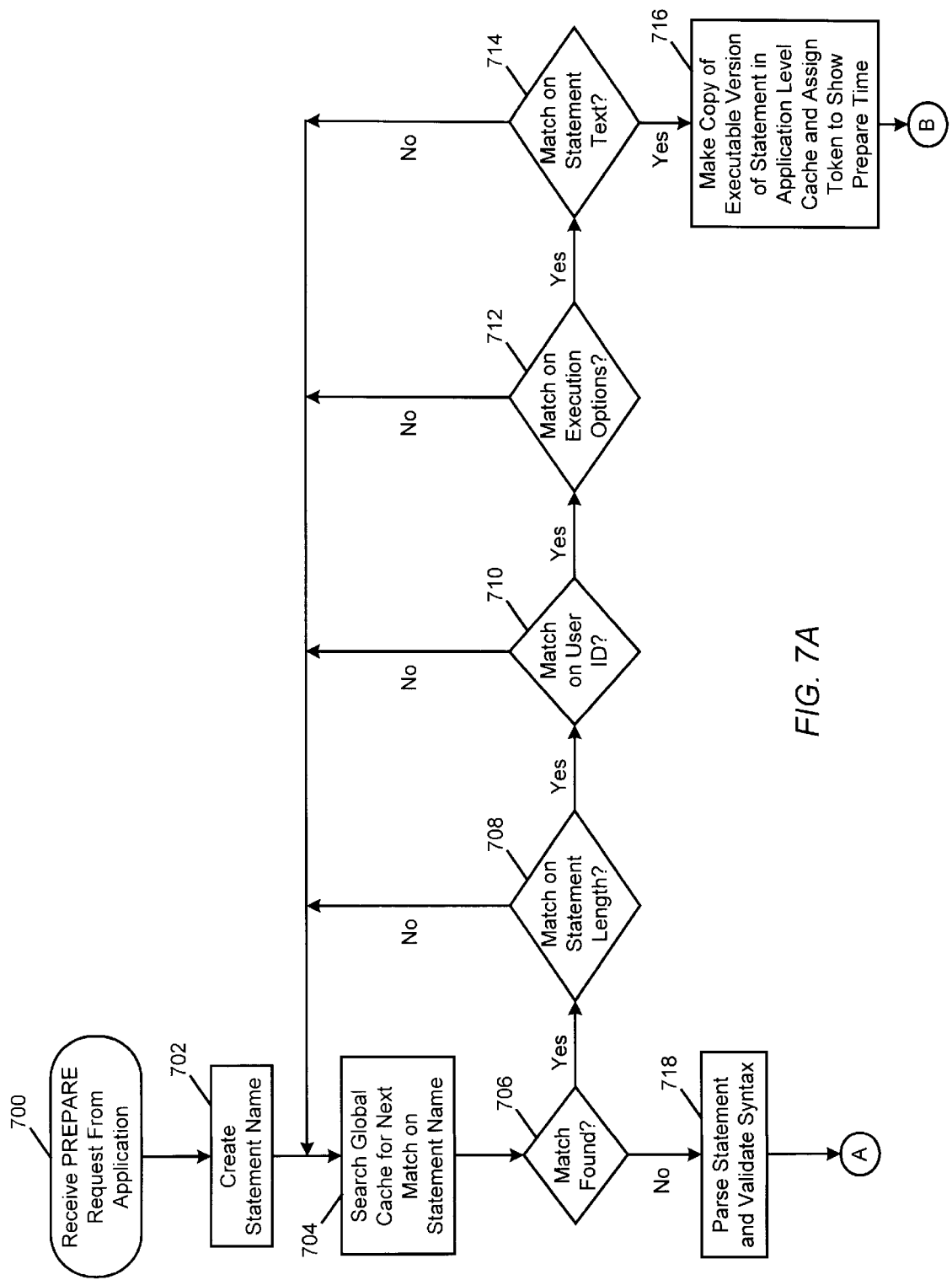
FIGS. 7A, 7B, and 7C illustrate a flow diagram of the steps performed by the two-level caching system when an application program issues a PREPARE request according to the present invention.
Figure 7B:
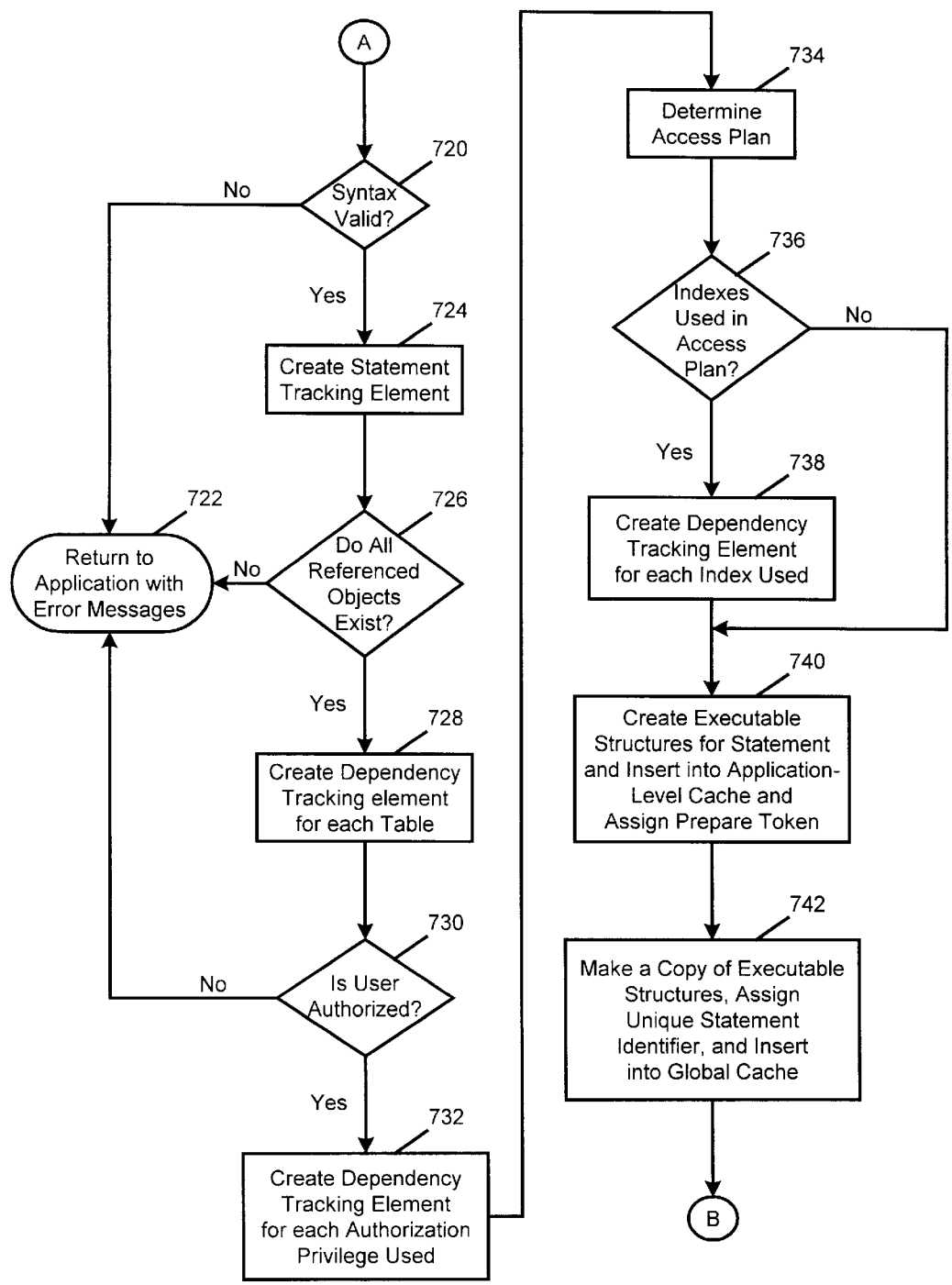
Figure 7C:
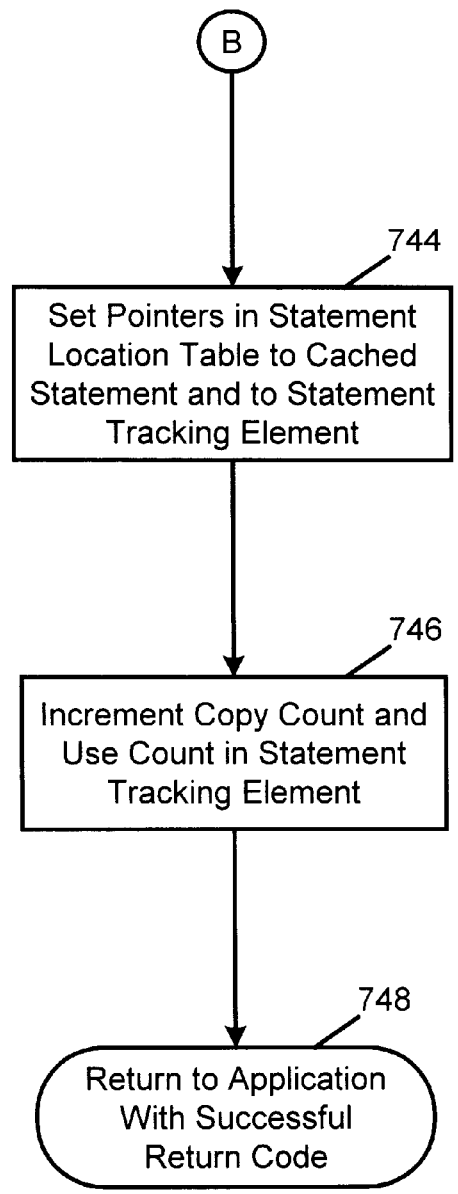

FIGS. 7A, 7B, and 7C illustrate a flow diagram of the steps performed by the two-level caching system 126 when an application program issues a PREPARE request according to the present invention. In Block 700, a PREPARE request is received from the application program. The input to the PREPARE request is, for example, the SQL statement illustrated in FIG. 4. In Block 702, the two-level caching system 126 uses the text of the SQL statement to create an internal statement name for the SQL statement. The statement name is created by taking 16 characters from the middle of the SQL statement text and removing any blanks. This technique for generating an identifier does not produce a unique name but is a good method for creating a different identifier for most SQL statements. In Block 704, the two-level caching system 126 uses the identifier to search the global cache. All SQL statements that have been prepared and stored in the global cache are recorded in a hash table. This hash table speeds the search of the global cache.

In Block 706, the two-level caching system 126 determines whether a match was found. If a match is found, the two-level caching system 126 continues to Block 708, otherwise, the two-level caching system 126 continues to Block 718. If the SQL statement was previously prepared, and exists in the global cache, then a matching entry will exist in the hash table. If a match is found on the SQL statement identifier, then additional checks are made. In Block 708, the two-level caching system 126 compares the lengths of the received statement and the prepared statement. If the statement lengths match, the two-level caching system 126 continues to Block 710, otherwise, the two-level caching system 126 loops back to Block 704. In Block 710, the two-level caching system 126 determines whether the user identifiers (IDs) match. The user identifier (i.e., authorization name) of the user requesting the prepare on the received SQL statement is compared to the user identifier of the user that inserted the already prepared SQL statement into the global cache. If the user identifiers match, the two-level caching system 126 continues to Block 712, otherwise, the two-level caching system 126 loops back to Block 704.

In Block 712, the two-level caching system 126 determines whether there is a match on execution options. That is, the application program execution options are compared for the received SQL statement and the prepared SQL statement in the global cache. If there is a match, the two-level caching system 126 continues to Block 714, otherwise, the two-level caching system 126 loops back to Block 704. In Block 714, the two-level caching system 126 determines whether the statement text matches. That is, the two-level caching system 126 compares the full SQL statement text of the received statement with the prepared statement in the global cache. This comparison is done last because it is the most costly. If there is a match, the two-level caching system 126 continues to Block 716, otherwise, the two-level caching system 126 loops back to Block 704.

In Block 716, the two-level caching system 126 makes a copy of the executable structures for the SQL statement for the application program issuing the prepare request. The two-level caching system 126 places the copy in the application-level cache. Then, the proper entry in the SQL statement location table is adjusted to point to this location. From Block 716, control passes to Block 744. As part of the process of making a copy of the executable SQL statement, any pointers that exist within that executable structure must be "relocated." Because the structure was moved from one location in memory to another, any pointers that point to locations with that structure must be adjusted to point at the new locations. If a match was not found in the global cache, in Block 718, the two-level caching system 126 prepares the received SQL statement by parsing the SQL statement and validating the SQL statement's syntax. The two-level caching system 126 assigns a prepare token at this point. This prepare token is assigned from an ever-increasing system variable. The prepare token is later used for determining the relative age of this SQL statement. This is needed when SQL statements need to be discarded from the application-level caches when the application-level caches grow too large. From Block 718, control passes to Block 720, which will be discussed below.

If a match was not found in the global cache, the normal prepare process is performed, except that the process is modified to allow the prepared SQL statement that is created to be inserted into the global cache. In Block 718, the two-level caching system 126 prepares the received SQL statement by parsing the SQL statement and validating the SQL statement's syntax, and then the two-level caching system 126 continues to Block 720. In Block 720, the two-level caching system 126 determines whether the syntax is valid. If the syntax is not valid, the two-level caching system 126 continues to Block 722, otherwise, the two-level caching system 126 continues to Block 724. In Block 722, the two-level caching system 126 returns to the application program with an error message.

In Block 724, the two-level caching system 126 creates a statement tracking element. The statement tracking element is used to track the number of users and the validity of the SQL statement. Associated with each SQL statement in the cache (i.e., the global cache or the application-level cache) is a statement tracking element. The statement tracking element records the number of users of each SQL statement and whether that SQL statement is currently valid. A pointer is set in the application program's statement location table to this statement tracking element so that the validity of the SQL statement can later be checked.

In Block 726, the two-level caching system 126 determines whether all referenced objects exist. That is, the two-level caching system 126 verifies that all tables and columns referenced in the SQL statement actually exist. If there are any invalid references, the two-level caching system 126 continues to Block 722, otherwise, the two-level caching system 126 continues to Block 728. In Block 722, the two-level caching system 126 returns to the application program with an error message. In Block 728, the two-level caching system 126 creates a dependency tracking element for each table so that the two-level caching system 126 can remember all of the tables that the SQL statement references. This is done by creating a dependency tracking element for each table, to record the fact that this SQL statement is dependent on the existence of that table. This information is recorded so that the two-level caching system 126 does not later permit another user to drop any table that an application program is currently using for a SQL statement.

Following the table checks, the two-level caching system 126 continues to Block 730. In Block 730, the two-level caching system 126 determines whether the user is authorized. That is, the two-level caching system 126 checks that the user running the application program is authorized to perform the actions specified in the SQL statement. For example, if the SQL statement is a SELECT for table T1, then the two-level caching system 126 will check that the user running the application program is authorized to read from that table. If the user does not have the proper authorization, the two-level caching system 126 continues to Block 722, otherwise, the two-level caching system 126 continues to Block 730. In Block 722, the two-level caching system 126 returns to the application program with an error message.

In Block 732, the two-level caching system 126 creates a dependency tracking element for each authorization privilege used. That is, if the user does have the proper authorization, then the two-level caching system 126 records this information in a dependency management element. In this case, the two-level caching system 126 is recording the fact that this SQL statement is dependent on the user having the authority to execute this SQL statement. If that authority is later revoked, the SQL statement will have to be marked invalid.

Next, the two-level caching system 126 begins the optimization process. This means that the two-level caching system 126 will consider all possible methods of accessing the data requested in the SQL statement. In Block 734, the two-level caching system 126 determines the access plan during the prepare process so that it will be ready to perform the access quickly when the SQL statement is later executed. The access plan chosen may involve the use of an index to access the data quickly. In Block 736, the two-level caching system 126 determines whether indexes are used in the access plan. If indexes are used, the two-level caching system 126 continues to Block 738, otherwise, the two-level caching system 126 continues to Block 740. In Block 738, the two-level caching system 126 creates a dependency tracking element for each index used to show that this SQL statement is dependent on the existence of the indexes.

In Block 740, the two-level caching system 126 creates the executable structures for the application-level cache and assigns a prepare token to the SQL statement. These executable structures are the end product of the prepare, and the executable structures specify the access plan and are placed in the application-level cache. In Block 742, the two-level caching system 126 makes a copy of the executable structures, assigns a unique statement identifier to the SQL statement, and inserts the executable form of the SQL statement into the global cache. This unique identifier is later used for locating that specific SQL statement. The two-level caching system 126 uses a name that it creates internally for each SQL statement, which is not necessarily unique. This internal name allows for quick searching using a hash table.

After the executable SQL statement has been placed in the application-level cache and global cache, the two-level caching system 126 continues to Block 744. In Block 744, the two-level caching system 126 sets pointers in the statement location table to the cached statement and to the statement tracking element. That is, the SQL statement location table is updated to show that the SQL statement is prepared and in-use. Pointer variables are set in the statement location table to point at the SQL statement text, at the prepared SQL statement, and at the statement tracking element.

In Block 746, the two-level caching system 126 increments a "copy" count and a "use" count in the statement tracking element. That is, the two-level caching system 126 records the fact that a copy of the SQL statement has been made for the application program by incrementing two different counters for the application program. First, the two-level caching system 126 increments a copy count to show that the application program has a copy of the prepared SQL statement in its application-level cache. Second, the two-level caching system 126 increments a use count to show that the application program is actively using this SQL statement. In Block 748, the two-level caching system 126 returns to the application program with an indication that the request was processed successfully.

Figure 8:
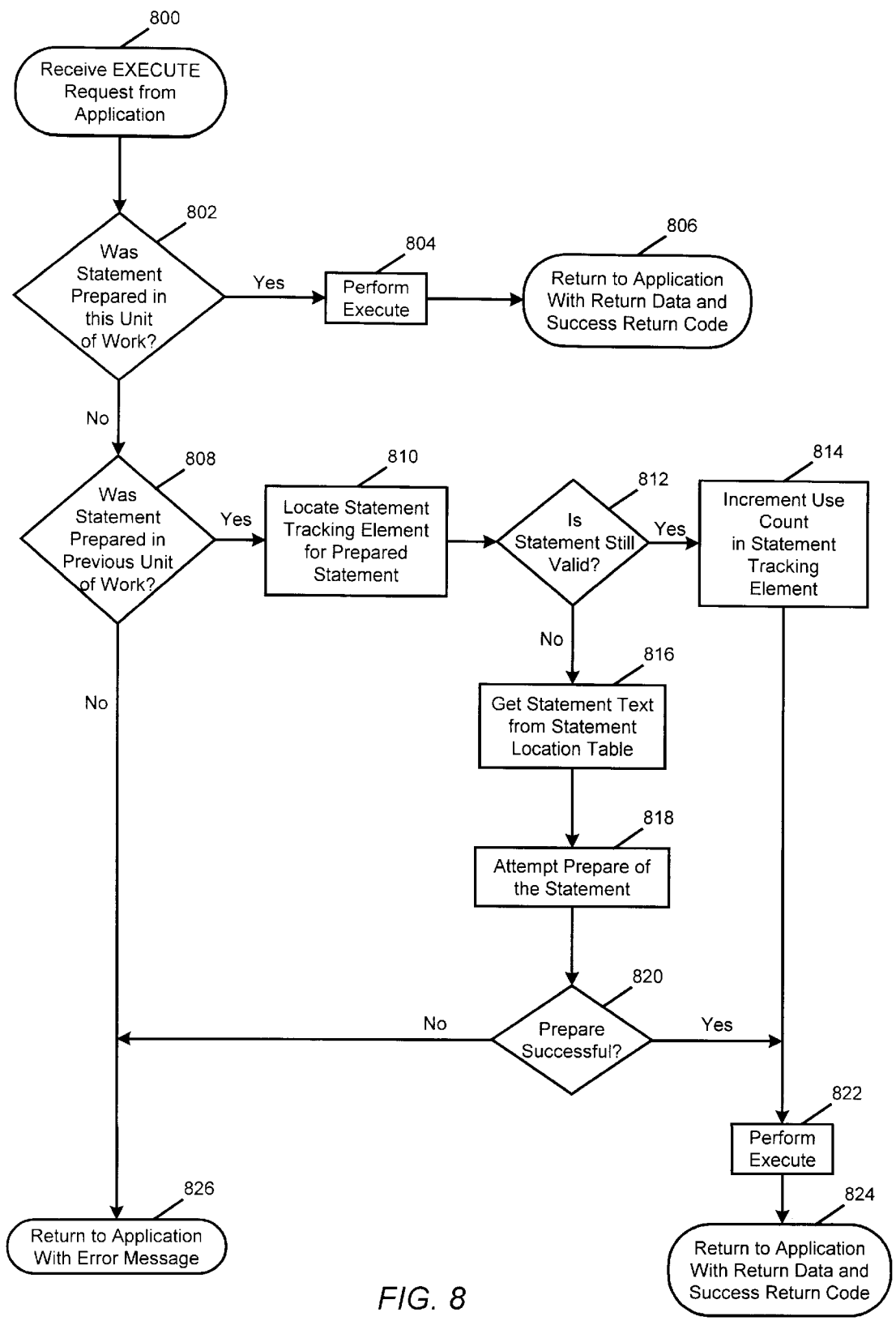
FIG. 8 is a flow diagram illustrating the steps performed by the two-level caching system when an application program issues an EXECUTE request according to the present invention.

FIG. 8 is a flow diagram illustrating the steps performed by the two-level caching system 126 when an application program issues an EXECUTE request according to the present invention. Although the logic of the flow diagram is directed to an EXECUTE request, similar logic would be used for an OPEN CURSOR request if the prepared SQL statement is a cursor-controlled SELECT statement. In Block 800, the two-level caching system 126 receives the EXECUTE request from the application program. In Block 802, the two-level caching system 126 determines whether the statement was prepared in the current unit of work. That is, the two-level caching system 126 checks to see whether the SQL statement identifier named on the EXECUTE request has had a prepared SQL statement in the current unit of work (i.e., whether a SQL statement was prepared since the last commit point). If the statement was prepared in the current unit of work, the two-level caching system 126 continues to Block 804, otherwise the two-level caching system 126 continues to Block 808. In Block 804, the two-level caching system 126 performs the EXECUTE request to execute the SQL statement. In Block 806, the two-level caching system 126 returns control to the application program, along with any returned data and an indication that the execution was successful (i.e., a success return code).

In Block 808, the two-level caching system 126 determines whether a prepared SQL statement had been saved in the application-level cache from a previous unit of work. If there is no SQL statement saved from a previous unit of work, the two-level caching system 126 continues to Block 826, otherwise, the two-level caching system 126 continues to Block 810. In Block 810, the two-level caching system 126 locates the statement tracking element for the prepared statement so that the SQL statement can be reinstated as an in-use copy of the SQL statement. In Block 812, the two-level caching system 126 determines whether the statement is still valid. In particular, the two-level caching system 126 uses the statement tracking element to determine the validity of the SQL statement. If, for example, a table or an index needed by the SQL statement had been dropped since the last commit point, the SQL statement would have been marked invalid. If the SQL statement is valid, the two-level caching system 126 continues to Block 814, otherwise, the two-level caching system 126 continues to Block 816.

In Block 814, the two-level caching system 126 increments the use count in the statement tracking element to indicate that the statement is being used. In Block 822, the statement is executed. Then, in Block 824, the two-level caching system 126 returns control to the application program, along with return data and a success return code.

If the statement was found to be invalid in Block 812, the two-level caching system 126 continues to Block 816. If the statement is found to be invalid, it is possible that the two-level caching system 126 can recover from this situation. For example, if an index used by the prepared SQL statement had been dropped, the prepared SQL statement could not be used. However, if the SQL statement were prepared again, the access plan chosen would not attempt to use that index. The prepare would complete, and the SQL statement could be executed. To drive the re-prepare of the SQL statement, the two-level caching system 126 retrieves the SQL statement text. This text is still preserved and can be located from the statement location table. In Block 816, the two-level caching system 126 gets statement text from the statement location table. In Block 818, the two-level caching system 126 attempts to prepare the statement. This prepare process is similar to the flow shown in FIGS. 7A, 7B, and 7C, except that here the two-level caching system 126 is requesting the prepare internally, rather than an external application program. Because the SQL statement was previously invalidated, it is quite possible that the prepare can fail. For example, if the SQL statement was invalidated because a table was dropped, the prepare will fail if the table has not been recreated since the drop.

In Block 820, the two-level caching system 126 determines whether the prepare was successful. If the prepare was successful, the two-level caching system 126 continues to Block 822 where the statement is executed, otherwise, the two-level caching system 126 continues to Block 826. In Block 826, the two-level caching system 126 returns control to the application program and returns an error message.

Figure 9:
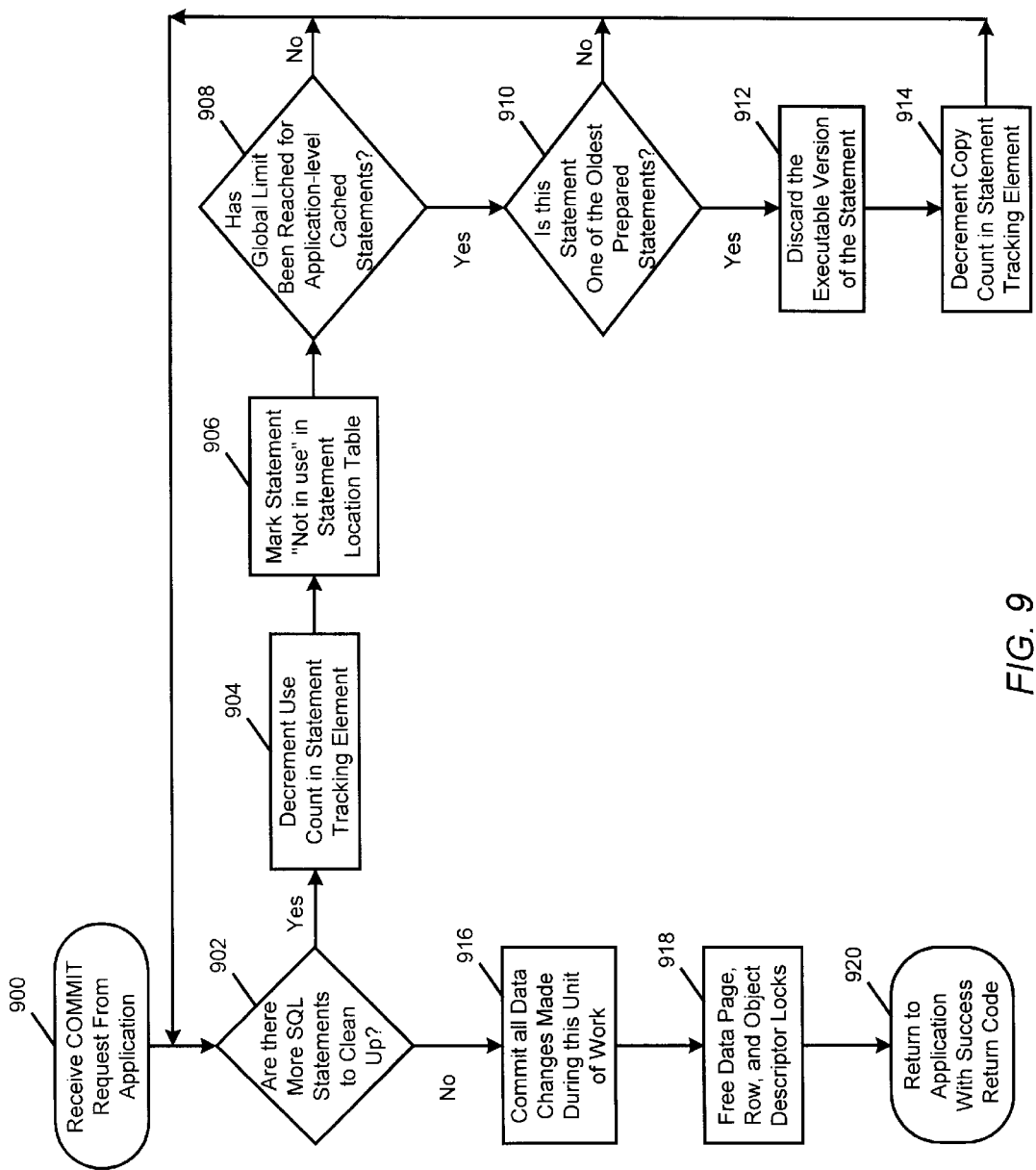
FIG. 9 is a flow diagram illustrating the steps performed by the two-level caching system when a commit operation is performed according to the present invention.

FIG. 9 is a flow diagram illustrating the steps performed by the two-level caching system 126 when a commit operation is performed according to the present invention. In addition to committing all data changes made by the program, the two-level caching system 126 also cleans up each of the SQL statements that have been used by the program. Additionally, the storage used for application-level caches for all application programs running in the system is monitored. If the number of SQL statements currently saved exceeds a system parameter that was set by, for example, an administrator, the two-level caching system 126 will examine the application program currently performing the commit operation to see if it owns any of the oldest cached SQL statements. If so, these are discarded to keep the system within the bounds of the specified limit.

In Block 900, the two-level caching system 126 receives the COMMIT operation request from the application program. In Block 902, the two-level caching system 126 determines whether there are more SQL that need to be cleaned up. If one is found, the two-level caching system 126 continues to Block 904, otherwise, the two-level caching system 126 continues to Block 916. In Block 904, the two-level caching system 126 decrements the use count for that SQL statement in the statement tracking element. In Block 906, the two-level caching system 126 marks the SQL statement "not-in-use" in the statement location table. In Block 910, the two-level caching system 126 determines whether the global limit has been reached for application-level cached statements. In particular, the two-level caching system 126 examines the state of the system by checking a system-wide counter to see how many SQL statements exist in all the application-level caches in the system. This total is compared to the maximum specified by the administrator.

If the total is less than the maximum, the two-level caching system 126 loops back to Block 902, otherwise, the two-level caching system 126 continues to Block 910. In Block 910, the two-level caching system 126 determines whether this statement is one of the oldest prepared statements. This is done by checking the prepare token that was assigned when this SQL statement was prepared. This is compared against a running counter to see how long ago the SQL statement was prepared. For example, assume that the administrator set the limit at 100 SQL statements. Assume that the tokens are assigned beginning with 100 and that the running counter was at 150 when the SQL statement was prepared. At that time, the SQL statement would have been assigned prepare token 151, and the running counter would be incremented. At the time for the commit operation, assume that the running counter is up to 300. The two-level caching system 126 will discard any SQL statement with prepare tokens less than 200 (that is 300–100). This will keep the 100 most recent SQL statements in the application-level caches.

If it was determined in Block 910 that this is not one of the oldest prepared statements, then the two-level caching system 126 loops back to Block 902, otherwise, the two-level caching system 126 continues to Block 912. In Block 912, the two-level caching system 126 discards the executable version of the statement. The SQL statement text for the SQL statement is retained even though the executable version of the SQL statement is discarded. In Block 914, the two-level caching system 126 decrements the copy count in the statement tracking element. The copy count is decremented to indicate that this user has lost the copy of the SQL statement.

When all SQL statements have been processed, the two-level caching system 126 continues to Block 916. In Block 916, the two-level caching system 126 commits all data changes made during the current unit of work. In Block, 918, the two-level caching system 126 frees all locks on data pages, rows, and object descriptors. In Block 920, the two-level caching system 126 returns control to the application program and returns a success return code.

Figure 10:
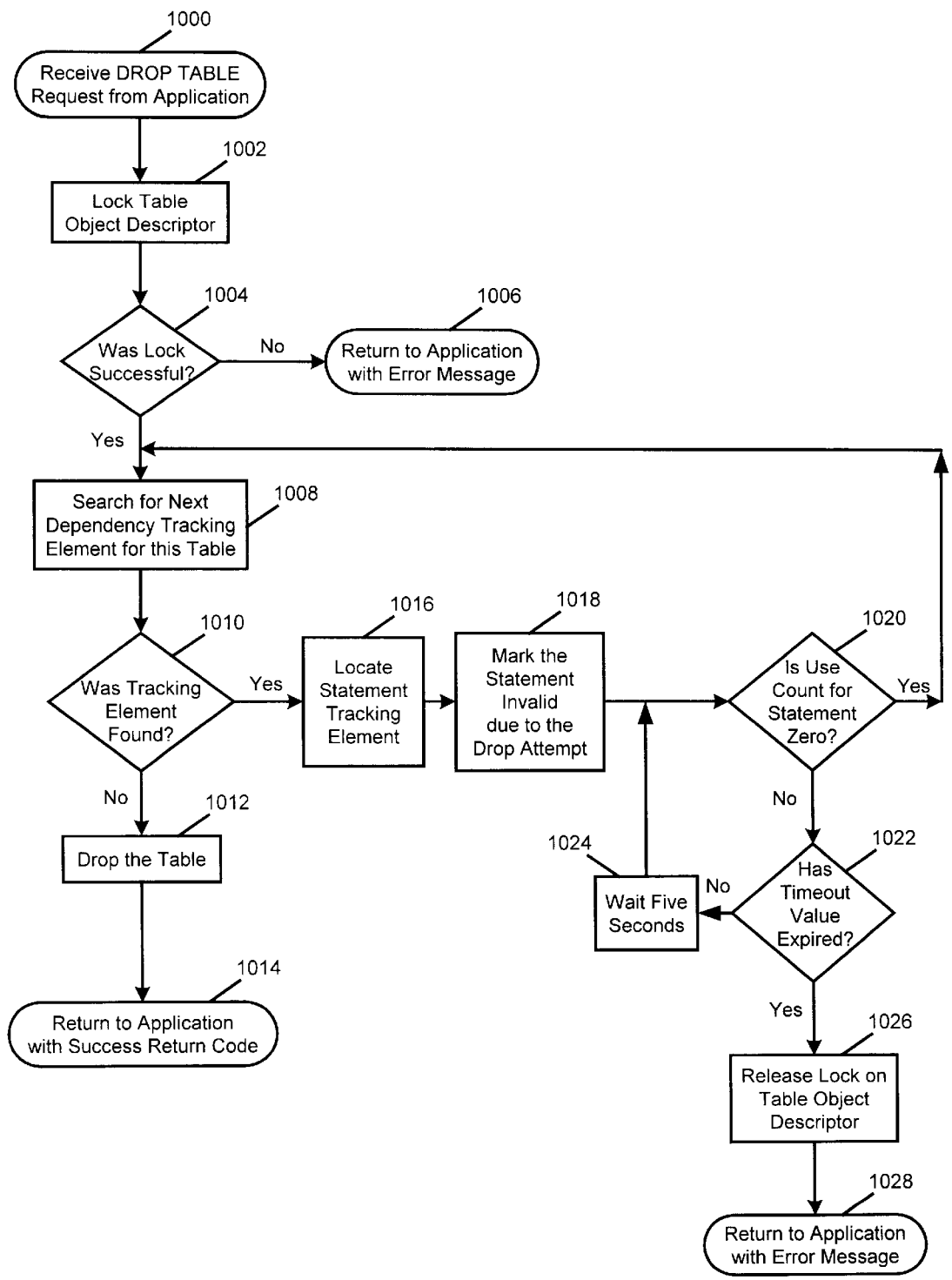
FIG. 10 is a flow diagram illustrating the steps performed by the two-level caching system when an application program issues a DROP TABLE request according to the present invention.

FIG. 10 is a flow diagram illustrating the steps performed by the two-level caching system 126 when an application program issues a DROP TABLE request according to the present invention. Although the flow diagram of FIG. 10 is directed to a DROP TABLE request, similar logic would be performed for a drop of any other database object or for an ALTER request for any object. When a user issues a request to drop a database object, such as a table, or to alter the characteristics of that object, any prepared SQL statements that reference the object and that are held in either the global or application-level caches are invalidated. However, if any of those SQL statements is currently in use by running application programs in their current unit of work, the drop or alter will not be permitted. The two-level caching system 126 waits for a specified period of time to allow other users to complete their unit of work and release the SQL statement. If this time period expires before the unit of work is completed, the drop or alter fails.

In Block 1000, the two-level caching system 126 receives a DROP TABLE request from the application program. In Block 1002, the two-level caching system 126 attempts to obtain a lock on the object descriptor for the table. Locking the object descriptor alerts other users in the system that the object is being changed. In Block 1004, the two-level caching system 126 determines whether the attempt was successful. If the attempt was successful, the two-level caching system 126 continues to Block 1008, otherwise, the two-level caching system 126 continues to Block 1006. If the lock request was unsuccessful, there must be some other user in the system that has locked the object. In Block 1006, the two-level caching system 126 returns control to the application program and returns an error message.

If the lock is obtained, in Block 1008, the two-level caching system 126 searches for the next dependency tracking element for the table. That is, the two-level caching system 126 proceeds to check the cached prepared SQL statements to see if there are current users with SQL statements that are dependent on the table. The two-level caching system 126 searches through all of the dependency tracking elements, looking for any that are for the table that is to be dropped. In Block 1010, the two-level caching system 126 determines whether a tracking element was found. If a tracking element was found, then the two-level caching system 126 continues to Block 1016, otherwise, the two-level caching system 126 continues to Block 1012. In Block 1012, after all tracking elements have been processed, and there are no users of SQL statements that reference the object, the two-level caching system 126 performs the DROP. In Block 1014, the two-level caching system 126 returns control to the application program and returns a success return code.

If a statement tracking element was found in Block 1010, the two-level caching system 126 continues to Block 1016. In Block 1016, the two-level caching system 126 uses information located in the found tracking element to locate the corresponding statement tracking element. In Block 1018, the two-level caching system 126 marks the SQL statement invalid in the statement tracking element. Although the drop request has not been granted yet, the SQL statement is marked invalid at this point to prevent other users from acquiring a copy of the SQL statement while the drop is being processed. In Block 1020, the two-level caching system 126 determines whether the use count for the SQL statement is zero. If the use count is zero, then there are no users for that SQL statement. Therefore, if the use count is zero, the two-level caching system 126 loops back to Block 1008, otherwise, the two-level caching system 126 continues to Block 1022. In Block 1008, the two-level caching system 126 searches for any remaining dependency tracking elements for the table.

If the use count is not zero, there are active users of the SQL statement. Then, in Block 1022, the two-level caching system 126 determines whether the time-out has expired. The two-level caching system 126 waits for a specified period to give the users of the SQL statement a chance to reach a commit point and release the SQL statement. This time-out value is set by an administrator. The time-out specifies how long the two-level caching system 126 should wait for events, such as the acquisition of locks. If the time-out value has expired, the two-level caching system 126 continues to Block 1026, otherwise, the two-level caching system 126 continues to Block 1024. In Block 1024, the two-level caching system 126 waits for a pre-specified amount of time, for example, five seconds, and then continues to Block 1020 to check the use count again. This process continues until the use count becomes zero or the time-out value is exceeded. Additionally, on reaching Block 1022 again, the two-level caching system 126 totals the 5 second increments and compares the total to the time-out value. If the time-out value is exceeded, the two-level caching system 126 continues to Block 1026.

In Block 1026, the two-level caching system 126 releases the lock acquired earlier on the object descriptor for the table. In Block 1028, the two-level caching system 126 returns control to the application program and returns an error messages.

Managing SQL Statements and Objects

Figure 11A:
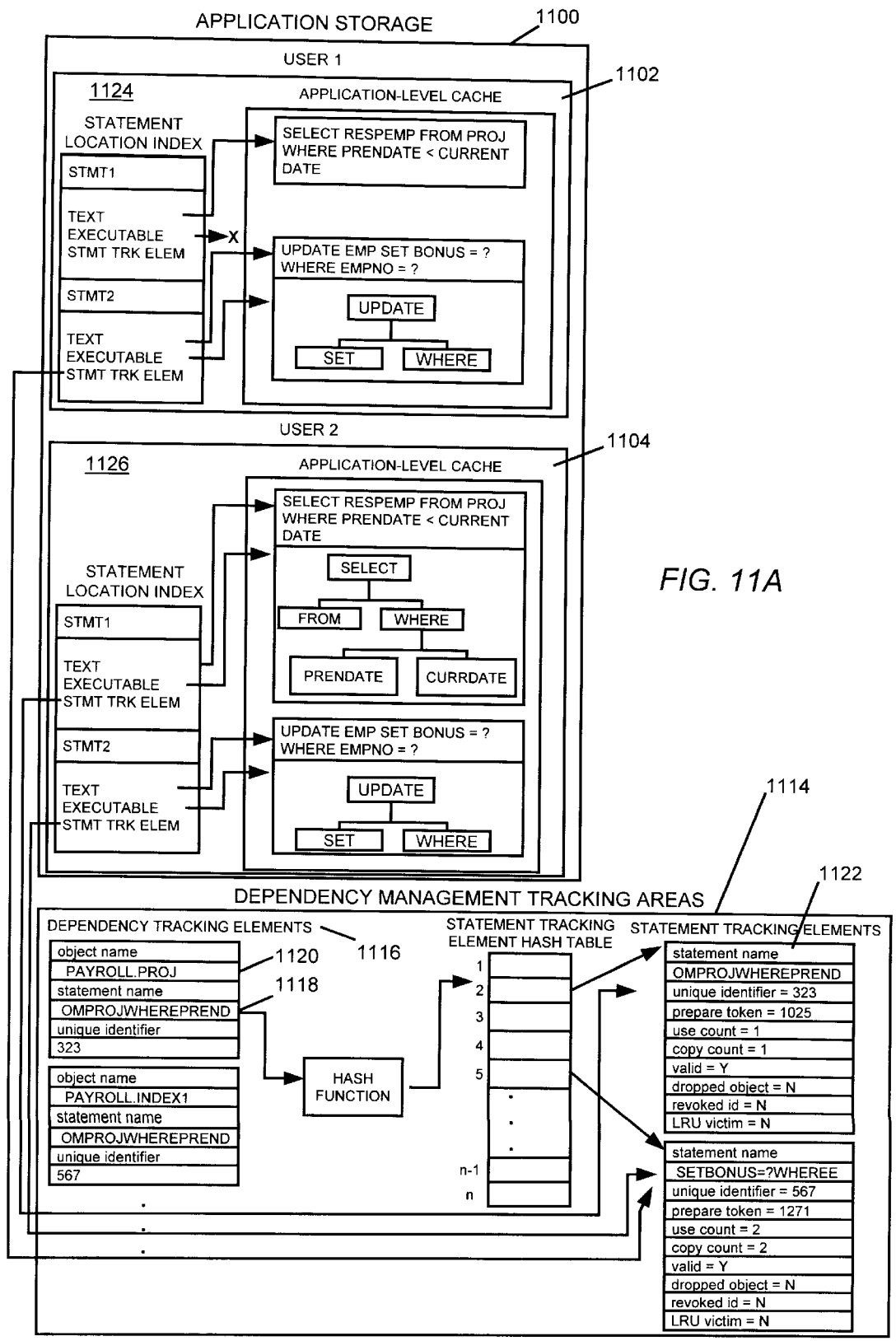
FIGS. 11A and 11B illustrate the structures used by the two-level caching system for managing the global and application-level cached SQL statements and for ensuring the validity of the cached SQL statements according to the present invention.
Figure 11B:
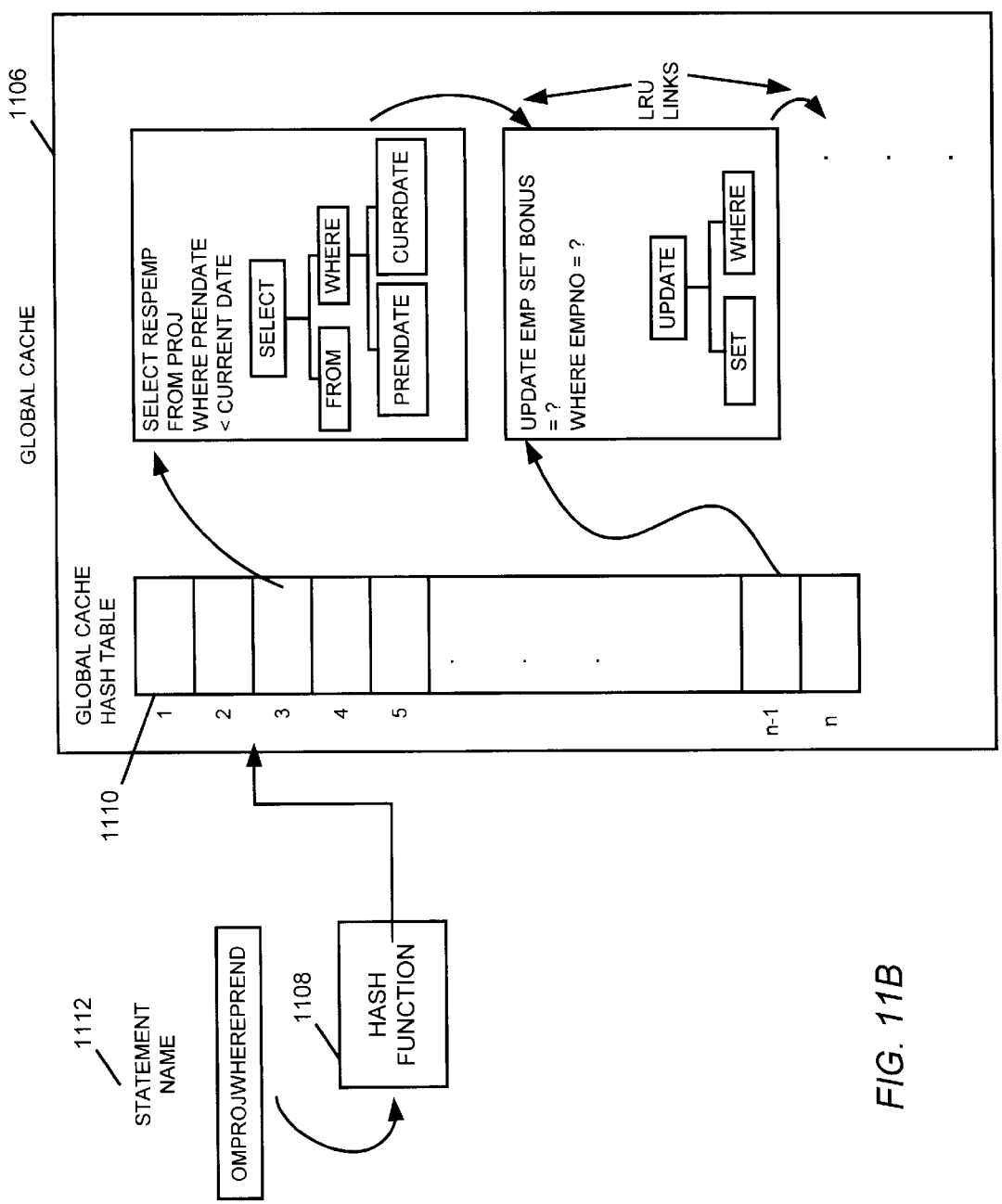

FIGS. 11A and 11B shows the structures used by the two-level caching system 126 for managing the global and application-level cached SQL statements and for ensuring the validity of the cached SQL statements according to the present invention. An application storage 1100 includes an application-level cache 1102 for USER1 and an application-level cache 1104 for USER2. A global cache 1106 is available to all users. A hash function 1108 is used to search the global cache hash table 1110 to locate a particular SQL statement. In particular, the text of the SQL statement is used to create a statement name 1112. The statement name becomes input to the hash function 1108. The output of the hash function is a numeric value that is used to index into the hash table 1110. From the hash table 1110, a pointer is retrieved that points to a chain of SQL statements that were hashed to that numeric value. If there are no entries at a particular hash table location, the global cache search is complete as there are no matching entries. However, if there are entries at the hash table location, the chain is searched for a SQL statement with a matching statement name. The matching statement name does not ensure an exact match, and so further comparisons are made on the SQL statement text, the user identifier, and execution options to verify that a particular cached SQL statement is a good match for a received SQL statement that is to be prepared and executed.

In the global cache 1106, links are also maintained among the cached SQL statements for the purpose of enforcing a least-recently-used policy for reclaiming space when the cache becomes full. If the global cache 1 106 does become full, then the SQL statements in the cache that were requested the longest time ago are discarded to make room for more recent cached SQL statements. The links track which are the oldest SQL statements. In particular, a SQL statement is moved to the first element in the linked list whenever it is requested. The oldest SQL statements then flow to the end of the list. If some SQL statements need to be discarded from the cache, the ones at the end of the list are discarded.

FIGS. 11A and 11B also illustrates dependency management tracking areas 1114. The control areas, labeled "Dependency Tracking Elements" 1116, each represent a dependency in the two-level caching system 126. For example, the first dependency tracking element shows that a SQL statement with the internal name 'OMPROJWHEREPREN' 1118 is dependent on the table name PAYROLL-.PROJ 1120. This is the internal name 1120 that the two-level caching system 126 generates for a SELECT statement. The internal name 1120 is generated from the SQL statement text. The internal name 1120 does not uniquely identify the SQL statement, but the internal name 1120 is used as a key for quickly locating the possible SQL statement matches in the global cache 1106 and in the Statement Tracking Elements 1122. Because the SQL statement name is not unique, there is also a unique numeric identifier to identify each SQL statement. That identifier is assigned when the SQL statement is originally prepared and placed in the global cache 1106.

The Statement Tracking Elements 1122 are used to monitor each of the SQL statements cached in the global and/or the application-level caches. A statement tracking element records the number of active users of the SQL statement, the number of users that have a copy in their application-level cache, and the status of the SQL statement. The statement tracking element also records whether the SQL statement is valid, and, if a statement is invalid, whether the statement has been invalidated by a DROP, ALTER, or REVOKE operation. The statement tracking element also shows whether the SQL statement has been removed from the global cache to make room for newer SQL statements using the LRU technique.

The dependency tracking elements 1116 and the statement tracking elements 1122 work together to regulate Data Definition Language (DDL) statements, such as DROP and ALTER, so that database objects are not dropped while SQL statements are actively using them. When a DDL request is processed, the dependency tracking elements 1116 are checked to see whether there are any SQL statements cached in the system that are dependent on the object that the DDL statement references. If there are dependencies, the proper statement tracking elements 1122 for those SQL statements are located.

The statement tracking elements 1122 are checked to see whether there are active users using the SQL statement by checking the user count in the statement tracking element 1122. If there are active users, the DDL statement will fail, after waiting a period of time for the use count to go to zero. If the use count is zero, the SQL statement is marked invalid. If there are no users with copies of the SQL statement in their application-level caches (i.e., the copy count is zero), the statement tracking element is removed. If the copy count is non-zero however, the statement tracking element remains. The copy count is an indication to other users that they can not use those SQL statements.

The statement location tables 1124, 1126 in the application storage 1100 contain pointers to the proper statement tracking elements. This allows the two-level caching system 126 to quickly check the validity of the application-level cached SQL statements. This check is done whenever, following a commit operation, an application program attempts to reuse a SQL statement that has been stored in the application-level cache. Before the SQL statement can be considered to be "in-use" after a commit point, the validity of the SQL statement is checked. If the SQL statement is valid, the use count for the SQL statement is incremented showing that there is one additional active user of that SQL statement.

Managing Storage Used for Global and Application-level Caches

The two-level caching system 126 attempts to achieve the highest levels of performance and throughput by keeping available as many prepared, executable SQL statements as practical. The two-level caching system 126 enforces limits on the amount of computer memory that is used for these cached SQL statements. Otherwise, all available computer memory could eventually be used. This storage limit enforcement is done differently for the global and the application-level caches. For the global cache, an LRU policy is enforced, as described above. The size of the global cache is established by an administrator when a the RDBMS is configured. The global cache storage and the SQL statements are managed by the two-level caching system 126 on a global basis. The two-level caching system 126 enforces the LRU policy for any SQL statement at any time, regardless of which application program requested a prepare of that SQL statement, because the SQL statements are not considered to belong to a particular user or application program.

For the application-level cache, the storage is managed at the application program level. Only when the two-level caching system 126 is operating on a particular user can the two-level caching system 126 discard some of that user's cached SQL statements in an application-level cache. For all application-level caches, a system limit is established by an administrator when configuring the RDBMS. The system limit specifies how many SQL statements are allowed to exist in all the application-level caches in the system (i.e., the system limit does not specify the amount of storage). The two-level caching system 126 enforces this system limit on a per-user basis. Whenever an application program requests a commit operation, the two-level caching system 126 examines whether the system limit for application-level cached statements has been reached. If the system limit has been exceeded, the two-level caching system 126 determines whether this user has any of the oldest cached SQL statements. The age of the SQL statements is based on when the SQL statement was inserted into the application-level cache. For example, in FIGS. 11A and 11B, the application storage for USER1 demonstrates this process. When USER1 performed a commit operation, the executable version of the SELECT statement associated with Statement 1 was discarded, and only the text version of the SQL statement remained. If the two-level caching system 126 determines that the current application program has cached some of the oldest statements, these are discarded from the application-level cache of that application program.

Recovery from Invalidated or Discarded Prepared SQL Statements

The executable versions of application-level cached SQL statements can be made unavailable while the program was not actively using them, for example, between a commit point and the next use of the cached SQL statement. When the application program does attempt an execute request for the SQL statement, the two-level caching system 126 attempts to recover from this by getting a new copy of the executable version of the SQL statement. Using this, the two-level caching system 126 can attempt to re-prepare the SQL statement. This prepare might be satisfied from the global cache, or it might require the full prepare process to be carried out. In either case, the processing performed to obtain an executable version of the SQL statement is transparent to the application program (i.e., the application program will not be aware that this processing has occurred). It is possible that the re-prepare will be unsuccessful if, for example, a table has been dropped and has not been recreated. In that case, the two-level caching system 126 returns an error for the execute request.

Managing Locks for Optimal Performance

An additional benefit of maintaining an application-level cache is that it allows for more optimal use of locks on the data that is being operated on. When the two-level caching system 126 executes a SQL statement that performs some operation on a table, such as a SELECT or an UPDATE, the two-level caching system 126 generally gets multiple types of locks. The two-level caching system 126 first acquires a "share" lock on the table itself. Then, as the two-level caching system 126 reads or modifies the rows in the table, the two-level caching system 126 acquires locks on the individual data pages or the individual rows in the table. When the application program reaches a commit point, the two-level caching system 126 releases any data page or row locks. For dynamic SQL, the two-level caching system 126 normally releases the share lock on the table as well. This was necessary because the prepared SQL statement was always discarded at commit points.

However, by preserving the SQL statements in the application-level cache, the two-level caching system 126 can provide the ability for the application program to retain the share lock on the table. This allows other users to read and update any of the rows in the table because the page and row locks are released at the commit point. When the application program requests another execute of the SQL statement following a commit point, the two-level caching system 126 does not need to acquire the share lock on the table because it already holds that lock. This provides considerable savings by eliminating the processing needed to acquire the lock. As explained earlier, SQL statements in the application-level cache can be invalidated or discarded from the application-level cache. When a SQL statement is discarded, any locks that were held past the last commit point must be released.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for a computer-implemented two-level caching system. The present invention provides improved caching for SQL statements, and in particular, provides two levels of caching for SQL statements. The present invention also provides dependency management for two levels of caching and management of a local cache and of locks for two levels of caching. The present invention also provides recovery from invalidated or discarded prepared statements for two levels of caching.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing a statement in a computer, the statement being executed by the computer to manipulate data in a database stored on a data storage device connected to the computer, the method comprising the steps of:

preparing a first statement to create an executable structure for executing the first statement from an application;

storing the executable structure in an application-level cache associated with the application across a commit operation;

receiving a second statement for execution from the application;

determining that the second statement can be executed using the stored executable structure for the first statement; and executing the second statement using the stored executable structure.

2. The method of claim 1, wherein the step of storing the executable structure further comprises the steps of:

storing all text of the first statement;

storing execution options of the first statement; and storing a user identifier of the first statement.

3. The method of claim 2, wherein the step of determining further comprises the step of comparing the text, the execution options, and the user identifier of the first and second statements.

4. The method of claim 1, further comprising the steps of:

determining that the application-level cache does not contain an executable structure for use in executing the second received statement;

determining that a global cache contains an executable structure that can be used for executing the second received statement; and copying the executable structure from the global cache to the application-level cache.

5. The method of claim 1, further comprising the step of disallowing a modification to any object referenced by the second statement until execution of the statement.

6. The method of claim 5, further comprising:

when receiving a request to modify an object referenced by the second statement, waiting a predetermined amount of time for the execution of the second statement to complete; and when the execution of the second statement does not complete within the predetermined amount of time, disallowing the request to modify the object.

7. The method of claim 1, further comprising the step of holding one or more locks beyond a commit operation for a dynamic statement.

8. The method of claim 1, further comprising the steps of:

monitoring a system limit on cached statements for all application-level caches;

determining that the system limit on cached statements for all application-level caches has been exceeded; and discarding some of the cached statements in one or more application-level caches based on predefined criteria.

9. The method of claim 8, wherein the predefined criteria comprises how recently the cached statements were prepared.

10. The method of claim 1, further comprising;

determining that a cached statement in an application-level cache is no longer available for use;

attempting to locate the statement in a global cache; and when the statement is not available in the global cache, preparing the statement using stored text for the statement in the application-level cache.

11. The method of claim 1, further comprising:

determining that a cached statement in an application-level cache is no longer available for use; and preparing the statement using stored text for the statement in the application-level cache.

12. An apparatus for executing a statement, comprising:

a computer having a data storage device connected thereto, wherein the data storage device stores a database;

one or more computer programs, performed by the computer, for preparing a first statement to create an executable structure for executing the first statement from an application, for storing the executable structure in an application-level cache associated with the application across a commit operation, for receiving a second statement for execution from the application, for determining that the second statement can be executed using the stored executable structure for the first statement, and for executing the second statement using the stored executable structure.

13. The apparatus of claim 12, wherein the means for storing the executable structure further comprises:

means for storing all text of the first statement;

means for storing execution options of the first statement; and means for storing a user identifier of the first statement.

14. The apparatus of claim 13, wherein the means for determining further comprises the means for comparing the text, the execution options, and the user identifier of the first and second statements.

15. The apparatus of claim 14, further comprising:

means for determining that the application-level cache does not contain an executable structure for use in executing the second received statement;

means for determining that a global cache contains an executable structure that can be used for executing the second received statement; and means for copying the executable structure from the global cache to the application-level cache.

16. The apparatus of claim 12, further comprising the means for disallowing a modification to any object referenced by the second statement until execution of the statement.

17. The apparatus of claim 16, further comprising:

means for, when receiving a request to modify an object referenced by the second statement, waiting a predetermined amount of time for the execution of the second statement to complete; and when the execution of the second statement does not complete within the predetermined amount of time, disallowing the request to modify the object.

18. The apparatus of claim 12, further comprising the means for holding one or more locks beyond a commit operation for a dynamic statement.

19. The apparatus of claim 12, further comprising:

means for monitoring a system limit on cached statements for all application-level caches;

means for determining that the system limit on cached statements for all application-level caches has been exceeded; and means for discarding some of the cached statements in one or more application-level caches based on predefined criteria.

20. The apparatus of claim 19, wherein the predefined criteria comprises how recently the cached statements were prepared.

21. The apparatus of claim 12, further comprising;

means for determining that a cached statement in an application-level cache is no longer available for use;

means for attempting to locate the statement in a global cache; and means for, when the statement is not available in the global cache, preparing the statement using stored text for the statement in the application-level cache.

22. The apparatus of claim 21, further comprising;

means for determining that a cached statement in an application-level cache is no longer available for use; and means for preparing the statement using stored text for the statement in the application-level cache.

23. An article of manufacture comprising a computer program carrier readable by a computer and embodying one or more instructions executable by the computer to perform method steps for executing a statement, the statement being performed by the computer to retrieve data from a database stored in a data storage device connected to the computer, the method comprising the steps of:

preparing a first statement to create an executable structure for executing the first statement from an application;

storing the executable structure in an application-level cache associated with the application across a commit operation;

receiving a second statement for execution from the application;

determining that the second statement can be executed using the stored executable structure for the first statement; and executing the second statement using the stored executable structure.

24. The method of claim 23, wherein the step of storing the executable structure further comprises the steps of:

storing all text of the first statement;

storing execution options of the first statement; and storing a user identifier of the first statement.

25. The method of claim 24, wherein the step of determining further comprises the step of comparing the text, the execution options, and the user identifier of the first and second statements.

26. The method of claim 23, further comprising the steps of:

determining that the application-level cache does not contain an executable structure for use in executing the second received statement;

determining that a global cache contains an executable structure that can be used for executing the second received statement; and copying the executable structure from the global cache to the application-level cache.

27. The method of claim 23, further comprising the step of disallowing a modification to any object referenced by the second statement until execution of the statement.

28. The method of claim 23, further comprising:

when receiving a request to modify an object referenced by the second statement, waiting a predetermined amount of time for the execution of the second statement to complete; and when the execution of the second statement does not complete within the predetermined amount of time, disallowing the request to modify the object.

29. The method of claim 23, further comprising the step of holding one or more locks beyond a commit operation for a dynamic statement.

30. The method of claim 23, further comprising the steps of:

monitoring a system limit on cached statements for all application-level caches;

determining that the system limit on cached statements for all application-level caches has been exceeded; and discarding some of the cached statements in one or more application-level caches based on predefined criteria.

31. The method of claim 30, wherein the predefined criteria comprises how recently the cached statements were prepared.

32. The method of claim 23, further comprising;

determining that a cached statement in an application-level cache is no longer available for use;

attempting to locate the statement in a global cache; and when the statement is not available in the global cache, preparing the statement using stored text for the statement in the application-level cache.

33. The method of claim 23, further comprising;

determining that a cached statement in an application-level cache is no longer available for use; and preparing the statement using stored text for the statement in the application-level cache.

* * * * *